United States Patent
Rivard et al.

(10) Patent No.: US 10,937,222 B2
(45) Date of Patent: *Mar. 2, 2021

(54) SYSTEMS AND METHODS FOR DISPLAYING REPRESENTATIVE IMAGES

(71) Applicant: Duelight LLC, Sunnyvale, CA (US)

(72) Inventors: William Guie Rivard, Menlo Park, CA (US); Brian J. Kindle, Sunnyvale, CA (US); Adam Barry Feder, Mountain View, CA (US)

(73) Assignee: DUELIGHT LLC, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/518,786

(22) Filed: Jul. 22, 2019

(65) Prior Publication Data
US 2019/0347843 A1   Nov. 14, 2019

Related U.S. Application Data

(63) Continuation of application No. 15/642,074, filed on Jul. 5, 2017, now Pat. No. 10,366,526, which is a
(Continued)

(51) Int. Cl.
| | |
|---|---|
| *G09G 5/00* | (2006.01) |
| *G06T 13/80* | (2011.01) |
| *G06F 3/0484* | (2013.01) |
| *G06F 3/0346* | (2013.01) |
| *G06T 3/60* | (2006.01) |
| *G09G 5/37* | (2006.01) |
| *G06T 1/20* | (2006.01) |

(Continued)

(52) U.S. Cl.
CPC ............ *G06T 13/80* (2013.01); *G06F 3/0346* (2013.01); *G06F 3/0484* (2013.01); *G06T 3/60* (2013.01); *G09G 5/37* (2013.01); *G06F 3/0482* (2013.01); *G06F 3/0485* (2013.01); *G06F 2200/1614* (2013.01); *G06F 2200/1637* (2013.01); *G06T 1/20* (2013.01); *G09G 2340/0492* (2013.01)

(58) Field of Classification Search
CPC ........ G06F 3/04845; G06F 2200/1614; G09G 2340/0492; G06T 3/60–608
See application file for complete search history.

(56) References Cited

U.S. PATENT DOCUMENTS

| 5,734,760 A | 3/1998 | Yoshida |
| 5,835,639 A | 11/1998 | Honsinger et al. |

(Continued)

OTHER PUBLICATIONS

Non-Final Office Action from U.S. Appl. No. 16/147,206, dated Oct. 18, 2019.
(Continued)

*Primary Examiner* — Charles Tseng
(74) *Attorney, Agent, or Firm* — Zilka-Kotab, P.C.

(57) ABSTRACT

A system, method, and computer program product for displaying representative images is disclosed. In use, a first relationship between each of two or more representative images is configured. A subpanel including the two or more representative images is displayed, and a notification indicating a new orientation for the subpanel is received. In response to the new orientation, an in-place rotation animation for each of the two or more representative images of the subpanel is generated, and the first relationship between each of the two or more representative images is maintained.

18 Claims, 19 Drawing Sheets

Related U.S. Application Data continuation of application No. 15/331,733, filed on Oct. 21, 2016, now Pat. No. 9,721,375.

(51) Int. Cl.
   *G06F 3/0482* (2013.01)
   *G06F 3/0485* (2013.01)

(56) References Cited

U.S. PATENT DOCUMENTS

| | | |
|---|---|---|
| 5,900,909 A | 5/1999 | Parulski et al. |
| 5,986,668 A | 11/1999 | Szeliski et al. |
| 5,987,164 A | 11/1999 | Szeliski et al. |
| 6,055,326 A | 4/2000 | Chang et al. |
| 6,061,696 A | 5/2000 | Lee et al. |
| 6,115,025 A | 9/2000 | Buxton et al. |
| 6,137,468 A | 10/2000 | Martinez et al. |
| 6,326,978 B1 | 12/2001 | Robbins |
| 6,704,007 B1 | 3/2004 | Clapper |
| 6,842,265 B1 | 1/2005 | Votipka et al. |
| 7,027,054 B1 | 4/2006 | Cheiky et al. |
| 7,030,868 B2 | 4/2006 | Clapper |
| 7,030,912 B1 | 4/2006 | Honma |
| 7,085,590 B2 | 8/2006 | Kennedy et al. |
| 7,352,361 B2 | 4/2008 | Yi |
| 7,626,598 B2 | 12/2009 | Manchester |
| 7,646,417 B2 | 1/2010 | Goto et al. |
| 7,730,422 B2 | 6/2010 | Russo |
| 7,903,115 B2 | 3/2011 | Platzer et al. |
| 7,978,182 B2 | 7/2011 | Ording et al. |
| 8,068,121 B2 | 11/2011 | Williamson et al. |
| 8,120,625 B2 | 2/2012 | Hinckley |
| 8,125,499 B2 | 2/2012 | Yamada |
| 8,217,964 B2 | 7/2012 | Laine et al. |
| 8,233,003 B2 | 7/2012 | Obinata |
| 8,314,817 B2 | 11/2012 | Williamson et al. |
| 8,363,145 B2 | 1/2013 | Iwamoto |
| 8,412,277 B2 | 4/2013 | Fujiwara |
| 8,451,296 B2 | 5/2013 | Ono |
| 8,531,465 B2 | 9/2013 | Platzer et al. |
| 8,543,946 B2 | 9/2013 | Kethireddy |
| 8,581,935 B2 | 11/2013 | Handa |
| 8,610,724 B2 | 12/2013 | Garg |
| 8,692,851 B2 | 4/2014 | Ording et al. |
| 8,717,293 B2 | 5/2014 | Wong et al. |
| 8,817,048 B2 | 8/2014 | Kerr et al. |
| 8,830,177 B2 | 9/2014 | Woo |
| 8,830,261 B2 | 9/2014 | Asai |
| 8,854,325 B2 | 10/2014 | Byrd et al. |
| 8,872,855 B2 | 10/2014 | Doll |
| 8,890,897 B2 | 11/2014 | Homma et al. |
| 8,896,632 B2 | 11/2014 | MacDougall et al. |
| 8,915,437 B2 | 12/2014 | Hoshino et al. |
| 8,933,960 B2 | 1/2015 | Lindahl et al. |
| 8,937,735 B2 | 1/2015 | Mori |
| 8,947,382 B2 | 2/2015 | Winkler et al. |
| 8,988,349 B2 | 3/2015 | Alberth et al. |
| 9,015,640 B2 | 4/2015 | de Leon |
| 9,070,229 B2 | 6/2015 | Williamson et al. |
| 9,098,069 B2 | 8/2015 | Dickinson et al. |
| 9,129,550 B2 | 9/2015 | Doll |
| 9,144,714 B2 | 9/2015 | Hollinger |
| 9,158,492 B2 | 10/2015 | Miyata |
| 9,165,533 B2 | 10/2015 | Paulson |
| 9,177,362 B2 | 11/2015 | Restrepo et al. |
| 9,189,069 B2 | 11/2015 | Hinckley |
| 9,196,076 B1 | 11/2015 | MacLeod |
| 9,215,405 B2 | 12/2015 | Atkinson |
| 9,232,124 B2 | 1/2016 | Song |
| 9,256,974 B1 | 2/2016 | Hines |
| 9,261,909 B2 | 2/2016 | Lam |
| 9,298,745 B2 | 3/2016 | Lee et al. |
| 9,342,138 B2 | 5/2016 | Ding |
| 9,383,202 B2 | 7/2016 | Zhou et al. |
| 9,417,836 B2 | 8/2016 | Postal et al. |
| 9,424,798 B2 | 8/2016 | Park |
| 9,459,781 B2 | 10/2016 | Wilson et al. |
| 9,478,012 B2 | 10/2016 | Uratani et al. |
| 9,489,927 B2 | 11/2016 | Aizawa |
| 9,495,025 B2 | 11/2016 | Ishikawa et al. |
| 9,507,379 B2 | 11/2016 | Kamei et al. |
| 9,507,445 B2 | 11/2016 | Sutton et al. |
| 9,552,076 B2 | 1/2017 | Homma et al. |
| 9,560,269 B2 | 1/2017 | Baldwin |
| 9,591,225 B2 | 3/2017 | Jung et al. |
| 9,628,647 B2 | 4/2017 | Tomono et al. |
| 9,646,576 B2 | 5/2017 | Masuko |
| 9,684,434 B2 | 6/2017 | Lewin et al. |
| 9,721,375 B1 | 8/2017 | Rivard et al. |
| 9,741,150 B2 | 8/2017 | Feder et al. |
| 9,761,033 B2 | 9/2017 | Flider |
| 9,779,481 B2 | 10/2017 | Yuasa |
| 9,798,395 B2 | 10/2017 | Ye et al. |
| 9,858,648 B2 | 1/2018 | Li et al. |
| 9,886,192 B2 | 2/2018 | Masuko |
| 9,942,464 B2 | 4/2018 | Voss |
| 9,953,454 B1 | 4/2018 | Rivard et al. |
| 10,088,866 B2 | 10/2018 | Braun et al. |
| 10,102,829 B2 | 10/2018 | Paulson |
| 10,109,098 B2 | 10/2018 | Feder et al. |
| 10,186,019 B2 | 1/2019 | Homma et al. |
| 10,365,820 B2 | 7/2019 | Lee et al. |
| 10,366,526 B2 | 7/2019 | Rivard et al. |
| 10,410,605 B2 | 9/2019 | Gardenfors et al. |
| 10,552,016 B2 | 2/2020 | Cherna et al. |
| 10,552,946 B2 | 2/2020 | Furukawa |
| 10,627,854 B2 | 4/2020 | Gurr et al. |
| 10,810,781 B2 | 10/2020 | Feder et al. |
| 2002/0063714 A1 | 5/2002 | Haas et al. |
| 2004/0150622 A1 | 8/2004 | Bohn |
| 2004/0184115 A1 | 9/2004 | Suzuki |
| 2005/0022131 A1 | 1/2005 | Saint-Hilaire et al. |
| 2005/0104848 A1 | 5/2005 | Yamaguchi et al. |
| 2005/0143124 A1 | 6/2005 | Kennedy et al. |
| 2005/0154798 A1 | 7/2005 | Nurmi |
| 2005/0237587 A1 | 10/2005 | Nakamura |
| 2005/0237588 A1 | 10/2005 | Gohara et al. |
| 2006/0026535 A1 | 2/2006 | Hotelling et al. |
| 2006/0029292 A1 | 2/2006 | Hagiwara |
| 2006/0033760 A1 | 2/2006 | Koh |
| 2006/0039630 A1 | 2/2006 | Kotani |
| 2006/0133695 A1 | 6/2006 | Obinata |
| 2007/0004451 A1 | 1/2007 | Anderson |
| 2007/0045433 A1 | 3/2007 | Chapman et al. |
| 2007/0136208 A1 | 6/2007 | Hamashima et al. |
| 2007/0236515 A1 | 10/2007 | Montague |
| 2007/0236709 A1 | 10/2007 | Mitani |
| 2007/0296820 A1 | 12/2007 | Lonn |
| 2008/0001945 A1 | 1/2008 | Kashito et al. |
| 2008/0001950 A1 | 1/2008 | Lin et al. |
| 2008/0043032 A1 | 2/2008 | Mamona et al. |
| 2008/0076481 A1 | 3/2008 | Iwasaki et al. |
| 2008/0122796 A1 | 5/2008 | Jobs et al. |
| 2008/0165144 A1 | 7/2008 | Forstall et al. |
| 2008/0174570 A1 | 7/2008 | Jobs et al. |
| 2008/0266326 A1 | 10/2008 | Porwal |
| 2008/0307363 A1 | 12/2008 | Jalon et al. |
| 2009/0002335 A1 | 1/2009 | Chaudhri |
| 2009/0002391 A1 | 1/2009 | Williamson et al. |
| 2009/0002395 A1 | 1/2009 | Yamada |
| 2009/0058882 A1 | 3/2009 | Adachi et al. |
| 2009/0237420 A1 | 9/2009 | Lawrenz |
| 2009/0262074 A1 | 10/2009 | Nasiri et al. |
| 2010/0007603 A1 | 1/2010 | Kirkup |
| 2010/0066763 A1 | 3/2010 | MacDougall et al. |
| 2010/0079494 A1 | 4/2010 | Sung et al. |
| 2010/0118115 A1 | 5/2010 | Takahashi et al. |
| 2010/0123737 A1 | 5/2010 | Williamson et al. |
| 2010/0123929 A1 | 5/2010 | Yoshimoto |
| 2010/0146446 A1 | 6/2010 | Ann et al. |
| 2010/0149377 A1 | 6/2010 | Shintani et al. |
| 2010/0218113 A1 | 8/2010 | White et al. |
| 2010/0302278 A1 | 12/2010 | Shaffer et al. |
| 2010/0302408 A1 | 12/2010 | Ito |

(56) References Cited

U.S. PATENT DOCUMENTS

| | | |
|---|---|---|
| 2010/0315656 A1 | 12/2010 | Agata |
| 2010/0317332 A1 | 12/2010 | Bathiche et al. |
| 2010/0333044 A1 | 12/2010 | Kethireddy |
| 2011/0012914 A1 | 1/2011 | Nakamura et al. |
| 2011/0037712 A1 | 2/2011 | Kim et al. |
| 2011/0037777 A1 | 2/2011 | Lindahl et al. |
| 2011/0057880 A1 | 3/2011 | Kasahara |
| 2011/0074973 A1 | 3/2011 | Hayashi |
| 2011/0090256 A1 | 4/2011 | Manchester |
| 2011/0158473 A1 | 6/2011 | Sun et al. |
| 2011/0167382 A1 | 7/2011 | van Os |
| 2011/0187749 A1 | 8/2011 | Dehmann et al. |
| 2011/0193982 A1 | 8/2011 | Kook et al. |
| 2011/0261075 A1 | 10/2011 | Tanaka |
| 2011/0298982 A1 | 12/2011 | Kobayashi |
| 2011/0310094 A1 | 12/2011 | Park et al. |
| 2012/0001943 A1 | 1/2012 | Ishidera |
| 2012/0033262 A1 | 2/2012 | Sakurai |
| 2012/0044266 A1 | 2/2012 | Mori |
| 2012/0056889 A1 | 3/2012 | Carter et al. |
| 2012/0057064 A1 | 3/2012 | Gardiner et al. |
| 2012/0081382 A1 | 4/2012 | Lindahl et al. |
| 2012/0139904 A1 | 6/2012 | Lee et al. |
| 2012/0154276 A1 | 6/2012 | Shin et al. |
| 2012/0162251 A1 | 6/2012 | Minamino et al. |
| 2012/0162263 A1 | 6/2012 | Griffin et al. |
| 2012/0176413 A1 | 7/2012 | Kulik et al. |
| 2012/0206488 A1 | 8/2012 | Ivong et al. |
| 2012/0229370 A1 | 9/2012 | Stroffolino et al. |
| 2012/0242683 A1 | 9/2012 | Asai |
| 2012/0250082 A1 | 10/2012 | Mori |
| 2012/0256959 A1 | 10/2012 | Ye et al. |
| 2012/0294533 A1 | 11/2012 | Ikenoue |
| 2012/0299964 A1 | 11/2012 | Homma et al. |
| 2012/0324400 A1 | 12/2012 | Caliendo, Jr. et al. |
| 2013/0016122 A1 | 1/2013 | Bhatt et al. |
| 2013/0038634 A1 | 2/2013 | Yamada et al. |
| 2013/0069988 A1 | 3/2013 | Kamei et al. |
| 2013/0069989 A1 | 3/2013 | Nagata et al. |
| 2013/0120256 A1 | 5/2013 | Ishidera et al. |
| 2013/0141464 A1 | 6/2013 | Hunt et al. |
| 2013/0162542 A1 | 6/2013 | Badali et al. |
| 2013/0176222 A1 | 7/2013 | Tanaka |
| 2013/0205244 A1 | 8/2013 | Decker et al. |
| 2013/0222231 A1 | 8/2013 | Gardenfors et al. |
| 2013/0222516 A1 | 8/2013 | Do et al. |
| 2013/0222646 A1 | 8/2013 | Tsubota et al. |
| 2013/0235071 A1 | 9/2013 | Ubillos et al. |
| 2013/0262486 A1 | 10/2013 | O'Dell et al. |
| 2013/0293502 A1 | 11/2013 | Kitatani |
| 2013/0328935 A1 | 12/2013 | Tu |
| 2013/0335317 A1 | 12/2013 | Liu et al. |
| 2014/0055494 A1 | 2/2014 | Mikawa |
| 2014/0063611 A1 | 3/2014 | Raymond et al. |
| 2014/0075286 A1 | 3/2014 | Harada |
| 2014/0075372 A1 | 3/2014 | Wu et al. |
| 2014/0078171 A1 | 3/2014 | Miyatake et al. |
| 2014/0085339 A1 | 3/2014 | Brady et al. |
| 2014/0085430 A1 | 3/2014 | Komori et al. |
| 2014/0096064 A1 | 4/2014 | Suzuki |
| 2014/0111548 A1 | 4/2014 | Shin |
| 2014/0118256 A1 | 5/2014 | Sonoda et al. |
| 2014/0168271 A1 | 6/2014 | Yu et al. |
| 2014/0177008 A1 | 6/2014 | Raymond et al. |
| 2014/0210754 A1 | 7/2014 | Ryu et al. |
| 2014/0215365 A1 | 7/2014 | Hiraga et al. |
| 2014/0240453 A1 | 8/2014 | Kim et al. |
| 2014/0240543 A1 | 8/2014 | Kim et al. |
| 2014/0258674 A1 | 9/2014 | Kim et al. |
| 2014/0307001 A1 | 10/2014 | Aizawa |
| 2014/0340428 A1 | 11/2014 | Shibayama |
| 2014/0359517 A1 | 12/2014 | Elings et al. |
| 2014/0362117 A1 | 12/2014 | Paulson |
| 2014/0365977 A1 | 12/2014 | Elyada et al. |
| 2014/0372914 A1 | 12/2014 | Byrd et al. |
| 2015/0029226 A1 | 1/2015 | Feder et al. |
| 2015/0035991 A1 | 2/2015 | Sachs et al. |
| 2015/0042669 A1 | 2/2015 | Van Nostrand et al. |
| 2015/0049119 A1 | 2/2015 | Homma et al. |
| 2015/0070458 A1 | 3/2015 | Kim et al. |
| 2015/0091945 A1 | 4/2015 | Uratani et al. |
| 2015/0095775 A1 | 4/2015 | Lewis et al. |
| 2015/0113368 A1 | 4/2015 | Flider |
| 2015/0113370 A1 | 4/2015 | Flider |
| 2015/0113371 A1 | 4/2015 | Flider |
| 2015/0169166 A1 | 6/2015 | Kim et al. |
| 2015/0193912 A1 | 7/2015 | Yuasa |
| 2015/0213784 A1 | 7/2015 | Jafarzadeh et al. |
| 2015/0215526 A1 | 7/2015 | Jafarzadeh et al. |
| 2015/0215532 A1 | 7/2015 | Jafarzadeh et al. |
| 2015/0278853 A1 | 10/2015 | McLaughlin et al. |
| 2015/0278999 A1 | 10/2015 | Summers et al. |
| 2015/0287189 A1 | 10/2015 | Hirai et al. |
| 2015/0302587 A1 | 10/2015 | Hirano et al. |
| 2015/0339002 A1 | 11/2015 | Arnold et al. |
| 2015/0339006 A1 | 11/2015 | Chaland et al. |
| 2015/0341536 A1 | 11/2015 | Huang et al. |
| 2016/0026658 A1 | 1/2016 | Krishnaraj et al. |
| 2016/0027150 A1 | 1/2016 | Lee et al. |
| 2016/0034166 A1 | 2/2016 | Wilson et al. |
| 2016/0034167 A1 | 2/2016 | Wilson et al. |
| 2016/0062645 A1 | 3/2016 | Masuko |
| 2016/0148551 A1 | 5/2016 | Jian |
| 2016/0148648 A1 | 5/2016 | Dimson et al. |
| 2016/0163289 A1 | 6/2016 | Masuko |
| 2016/0170608 A1 | 6/2016 | Zambetti et al. |
| 2016/0173782 A1 | 6/2016 | Dimson et al. |
| 2016/0202866 A1 | 7/2016 | Zambetti et al. |
| 2016/0202872 A1 | 7/2016 | Jang et al. |
| 2016/0240168 A1 | 8/2016 | Keal et al. |
| 2016/0248968 A1 | 8/2016 | Baldwin |
| 2016/0275650 A1 | 9/2016 | Case et al. |
| 2016/0313781 A1 | 10/2016 | Jeon et al. |
| 2016/0330383 A1 | 11/2016 | Oyama |
| 2016/0344927 A1 | 11/2016 | Brasket et al. |
| 2016/0357420 A1 | 12/2016 | Wilson et al. |
| 2017/0048442 A1 | 2/2017 | Cote et al. |
| 2017/0061669 A1 | 3/2017 | Hirano et al. |
| 2017/0236253 A1 | 8/2017 | Restrepo et al. |
| 2017/0278292 A1 | 9/2017 | Feder et al. |
| 2017/0285743 A1 | 10/2017 | Yu et al. |
| 2017/0323149 A1 | 11/2017 | Harary et al. |
| 2018/0061126 A1 | 3/2018 | Huang et al. |
| 2018/0067633 A1 | 3/2018 | Wilson et al. |
| 2018/0088775 A1 | 3/2018 | Ye et al. |
| 2018/0114351 A1 | 4/2018 | Rivard et al. |
| 2018/0114352 A1 | 4/2018 | Rivard et al. |
| 2018/0115702 A1 | 4/2018 | Brauer et al. |
| 2018/0130182 A1 | 5/2018 | Bhatt et al. |
| 2018/0341383 A1 | 11/2018 | Sully |
| 2019/0035135 A1 | 1/2019 | Feder et al. |
| 2020/0106956 A1 | 4/2020 | Kimball et al. |

OTHER PUBLICATIONS

Non-Final Office Action from U.S. Appl. No. 14/340,557, dated Jan. 21, 2016.

Final Office Action from U.S. Appl. No. 14/340,557, dated Sep. 16, 2016.

Easy Flex, Two Examples of Layout Animations, Apr. 11, 2010, pp. 1-11, http://evtimmy.com/2010/04/two-examples-of-layout-animations/.

Tidwell, J., "Animated Transition," from Designing Interfaces, O'Reilly Media, Inc., Dec. 2010, pp. 127-129.

Notice of Allowance from U.S. Appl. No. 15/331,733, dated Dec. 7, 2016.

Notice of Allowance from U.S. Appl. No. 14/340,557, dated Mar. 3, 2017.

Notice of Allowance from U.S. Appl. No. 15/331,733, dated Apr. 17, 2017.

Non-Final Office Action from U.S. Appl. No. 15/452,639, dated May 11, 2017.

(56) References Cited

OTHER PUBLICATIONS

International Search Report and Written Opinion from PCT Application No. PCT/US17/57704, dated Nov. 16, 2017.
Notice of Allowance from U.S. Appl. No. 15/452,639, dated Nov. 30, 2017.
Corrected Notice of Allowance from U.S. Appl. No. 14/340,557, dated Jul. 27, 2017.
Non-Final Office Action from U.S. Appl. No. 15/622,520, dated Jan. 10, 2018.
Notice of Allowance from U.S. Appl. No. 15/622,520, dated Jul. 18, 2018.
Non-Final Office Action from U.S. Appl. No. 15/642,074, dated Oct. 19, 2018.
Notice of Allowance from U.S. Appl. No. 15/642,074, dated Apr. 10, 2019.
Feder et al., U.S. Appl. No. 16/147,206, filed Sep. 28, 2018.
Corrected Notice of Allowance from U.S. Appl. No. 16/147,206, dated Aug. 27, 2020.
Feder et al., U.S. Appl. No. 17/023,159, filed Sep. 16, 2020.
Notice of Allowance from U.S. Appl. No. 16/147,206, dated Jun. 19, 2020.

SYSTEMS AND METHODS FOR DISPLAYING REPRESENTATIVE IMAGES

CROSS-REFERENCES TO RELATED APPLICATIONS

The present application is a continuation of and claims priority to U.S. patent application Ser. No. 15/642,074, entitled "SYSTEMS AND METHODS FOR DISPLAYING REPRESENTATIVE IMAGES," filed Jul. 5, 2017, which in turn is a continuation of and claims priority to U.S. patent application Ser. No. 15/331,733, entitled "SYSTEMS AND METHODS FOR DISPLAYING REPRESENTATIVE IMAGES," filed Oct. 21, 2016, now U.S. Pat. No. 9,721,375 issued Aug. 1, 2017, which is hereby incorporated by reference for all purposes.

This application is related to the following which are each being incorporated herein by reference in their entirety for all purposes: U.S. patent application Ser. No. 14/340,557, filed Jul. 24, 2014, entitled "SYSTEMS AND METHODS FOR DISPLAYING REPRESENTATIVE IMAGES," now U.S. Pat. No. 9,741,150 issued Aug. 22, 2017; and U.S. Provisional Application No. 61/958,324, filed Jul. 25, 2013, entitled "SYSTEMS AND METHODS FOR DIGITAL PHOTOGRAPHY," which is hereby incorporated by reference for all purposes.

FIELD OF THE INVENTION

Embodiments of the present invention relate generally to user interface design, and more specifically to systems and methods for displaying representative images.

BACKGROUND

In conventional operation, display pages comprising graphical user interfaces are often constrained by a grid, by sequence, or by a predetermined location (e.g. top of a screen). However, as the user manipulates a device displaying a graphics user interface, a consistent experience from one orientation to another is not maintained. For example, swiping from left to right on a home screen of a device in a first orientation does not carry over to a similar left to right motion in a second orientation.

Additionally, typical collection viewers enable users to view a collection of representative images as a two-dimensional grid of representative images. The representative images are conventionally positioned within the grid according to a specific sequence, such as a file name, a file sequence number, a sort sequence number, or an image sequence number. The grid is populated with representative images placed in different screen locations as a function of device orientation. Width of the grid is associated with horizontal screen width, which may be different in landscape versus portrait orientations. As a consequence, the physical location of a specific representative image may change when device orientation changes because the collection viewer typically needs to alter the grid layout of the representative images. Changing the physical location of a representative image in response to a device orientation change commonly causes the user to lose track of the representative image after the orientation change. The user is then forced to scan the collection viewer to find the relocated image, creating a frustrating, time consuming, and inefficient experience. Additional time needed by the user to locate the representative image typically results in diminished overall power efficiency for a device in performing specified operations.

As the foregoing illustrates, there is a need for addressing this and/or other related issues associated with the prior art.

SUMMARY

A system, method, and computer program product for displaying representative images is disclosed. In use, a first relationship between each of two or more representative images is configured. A subpanel including the two or more representative images is displayed, and a notification indicating a new orientation for the subpanel is received. In response to the new orientation, an in-place rotation animation for each of the two or more representative images of the subpanel is generated, and the first relationship between each of the two or more representative images is maintained.

BRIEF DESCRIPTION OF THE DRAWINGS

So that the manner in which the above recited features of embodiments of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
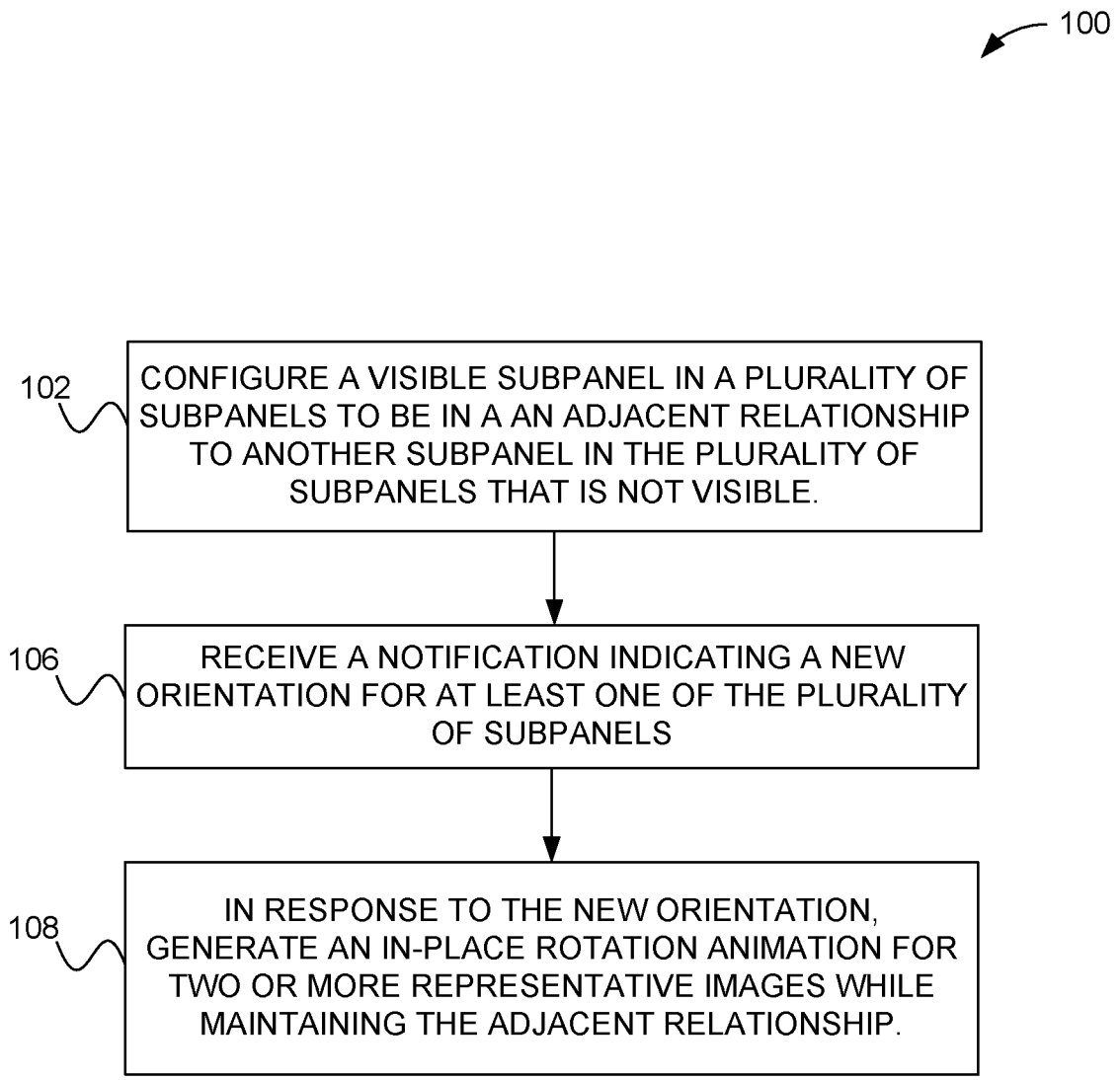
FIG. 1A illustrates a flow chart of a method for displaying two or more representative images within one or more subpanels, in accordance with an embodiment.

Embodiments of the present disclosure allow a mobile device to present a consistent location of representative images regardless of device orientation within a user interface (UI). A collection viewer refers to a collection of software modules that generate a depiction of data objects within a UI. Displayed UI elements generated by the software modules may also be referred to generally as a collection viewer. A collection viewer is configured to present representative images of the data objects, such as file icons and image thumbnails to a user. A collection viewer may comprise a file browser, an image browser, or any other type of data object browser configured to depict data objects as representative images. When the user rotates the mobile device, the collection viewer generates an in-place rotation animation for each representative image. Keeping each representative image in substantially the same physical screen location regardless of device orientation allows the user to visually track a given representative image through device rotation, thereby providing a more efficient and intuitive user experience. Animating rotation of the representative images to maintain proper viewing orientation provides an intuitive visual cue, further improving the user experience.

In certain embodiments, a plurality of representative images may be organized into one or more two-dimensional (2D) patterns, such as one or more grid patterns, for display. A given grid pattern of representative images at a given zoom level (e.g. a default zoom level) may be larger than a physical display screen being used to display the representative images. A view panel may define a visible region of the one or more grid patterns. For example, a set of representative images may be organized into a grid pattern that is as wide as a physical display screen for a mobile device in a portrait orientation and at a default zoom level; however, the grid pattern may have a larger vertical extent in the portrait orientation than the physical display screen can present at any one time. The view panel, which occupies at least a portion of the physical display screen, defines a visible portion of the grid pattern. A user may scroll through the set of representative images by scrolling up or down along the vertical extent of the grid pattern. Continuing the above example, in a landscape orientation the larger vertical extent associated with portrait orientation becomes a larger horizontal extent, and the user may scroll through the set of representative images by scrolling side to side. In both device orientations, each representative image is displayed with the image up direction oriented to a physical up direction.

A given grid pattern may be fully or partially populated with representative images. A given grid pattern may conform to any spatial granularity for locating representative images. In one embodiment, the spatial granularity generally corresponds to the size of a representative image being displayed, so that each representative image may snap to a position that does not overlap with a different representative image. In another embodiment, the spatial granularity may correspond to the size of a pixel or sub-pixel, so that representative images may be positioned in arbitrary locations, including locations that cause representative images to overlap.

In certain other embodiments, one or more grid patterns may have a 2D extent that is larger in two dimensions than the physical display screen. In such embodiments, the user may scroll in two dimensions (e.g., vertical and horizontal) to bring different portions of the one or more grid patterns and therefore different representative images into view within the view panel. In one embodiment, when a given representative image is visible within the view panel, the user may select the representative image and perform an action with respect to the representative image (e.g., execute, open, view, move relative to others, etc.).

In certain embodiments, the representative images are organized into subpanels, wherein each subpanel may include any number of representative images and/or grid patterns of representative images. A given subpanel may include a reference coordinate and each representative image positioned within the subpanel is located at a 2D offset with respect to the reference coordinate. The offset is preserved regardless of rotational orientation of a mobile device. A given offset may be specified between the reference coordinate and a geometric feature of a representative image. The geometric feature may be a corner, a centroid, a center of rotation, and the like. When the device orientation changes (e.g., the user rotates the mobile device between a portrait orientation and a landscape orientation), each subpanel may rotate to track the device orientation, and each representative image within each subpanel may rotate inversely to maintain a physically consistent image orientation for display. For example, a mobile device may be configured to display a first subpanel that includes a first set of representative images and a second subpanel that includes a second set of representative images. When the mobile device is rotated between a portrait orientation and a landscape orientation, each of the two subpanels follows the device orientation. In other words, a given subpanel simply follows the device rotation by not altering the general outline displayed for the subpanel. However, each representative image may rotate in place to be displayed at a rotation angle that generally compensates for device orientation changes, thereby maintaining an upright appearance. In one embodiment, the rotation angle is quantized into ninety-degree steps for displaying representative images at rest (device orientation is not changing). In certain embodiments, rotation between the ninety-degree steps is animated through a sequence of animation frames using finer angular steps for a smooth appearance of rotation. In the context of the present description, an animation frame includes an arbitrary number of rendered representative images that are composited together for display as the animation frame.

In one embodiment, a first subpanel includes a first set of representative images that are visible within the view panel when the view panel is being displayed at a specific (e.g., default) zoom level and the first subpanel is selected for display. A second, adjacent subpanel may include a second set of representative images that are visible within the view panel when the second subpanel is selected for display. For example, a first subpanel may include icons located within a home screen of a mobile device. A second subpanel may include icons located within an adjacent screen. Furthermore, the user may perform a touch swipe gesture to scroll between the first subpanel (home screen) and the second subpanel (adjacent screen), thereby selecting one of the two subpanels for display. When the user changes the device orientation (e.g., between portrait and landscape), representative images within each subpanel rotate to compensate for the device rotation. Representative images that are visible within the view panel may be rotated using a rotation animation over a sequence of animation frames. Furthermore, the rotation animation of each visible representative image may be synchronized so that the representative images appear to rotate together. In one embodiment, the synchronized aspect of the rotation animation of each visible representative image may include a threshold value (e.g. rotation animation begins within a set number of milliseconds of a preceding rotation animation, etc.).

In one embodiment, only a default zoom level is availed to the user. In another embodiment, the user may vary the zoom level from the default zoom level, for example to zoom in and/or zoom out. In one embodiment, a zoom level applied to a given subpanel is applied only to the subpanel and when a user selects a different subpanel (e.g., using a swipe gesture) the zoom level is reset to a default zoom level. Furthermore, each time a given subpanel is selected, the zoom level for the selected subpanel is reset to the default zoom level. In an alternative embodiment, zoom level may be preserved for newly selected subpanels. For example, if a user zooms in on a first subpanel, and subsequently selects a second subpanel, the second subpanel is displayed at the zoom level set for the first subpanel. In one such embodiment, the user may use a swipe gesture to pan around within a first zoomed-in subpanel, and use the same swipe gesture to select an adjacent subpanel when the first subpanel is pan position is at the edge of the device screen. In other embodiments, different gestures may be used (e.g., one touch versus two touch) used to pan versus select a different subpanel. In one embodiment, zooming out is constrained to the default zoom level, thereby limiting how small a representative image may be displayed and constraining the number of visible subpanels to one.

FIG. 1A illustrates a method 100 for displaying two or more representative images within one or more subpanels, according to one embodiment. As shown, an adjacent relationship is configured between a visible subpanel of the plurality of subpanels and at least one not-visible subpanel of the plurality of subpanels. See operation 102. In the context of the present description, the adjacent relationship includes a link, a loading of content, an analysis, a pointer, an attachment, a grouping of elements, or any association between two or more interface elements. By way of an example, a home screen (i.e. visible subpanel) on a device may include an ability to swipe right or left (i.e. along adjacent relationship) to a separate not-yet-visible screen (i.e. not-visible subpanel).

Additionally, a visible subpanel includes any grouping of graphical control elements which is actively displayed. For example, in one embodiment, actively displayed may include displaying in real time content (e.g. an application, a grouping of icons, a home screen, etc.) on a mobile device screen. Further, a non-visible subpanel includes any grouping of graphical control elements which is not actively displayed. For example, in one embodiment, not actively displayed may include content (e.g. an application, a grouping of icons, a different home screen, etc.) but which are currently not shown on the mobile device screen (e.g. hidden or inactive user interface elements).

Further, in the context of the present description, an adjacent relationship includes a first subpanel arranged next to a second (or other) subpanel in a straight manner. In one embodiment, an adjacent relationship may be a linear relationship. For example, if the first subpanel was centered (hypothetically), the second subpanel may be arranged at any point surrounding the first subpanel, and to switch (e.g., select which is visible) from the first subpanel to a second subpanel, a user input may be received comprising a touch swipe gesture in a straight motion from the direction of the second subpanel. Of course, the second subpanel may be arranged in any manner and made visible based on a linear orientation between the first subpanel and the second subpanel.

A second relationship is configured between each of the two or more representative images and an associated subpanel, wherein the second relationship defines a location on the associated subpanel where each of the two or more representative images is displayed. The second relationship may include an offset relative to a physical display location for each representative image when an enclosing subpanel is visible. The second relationship is preserved through changes in device orientation. For example, a home screen (e.g. one of a plurality of subpanels) may include icons, widgets, and/or any object that is displayed at a specific location (i.e. second relationship) on the home screen. During a change in device orientation, the second relationship is preserved as a consequence of keeping each representative image in the same physical screen location (same offset) and rotating each representative image in place.

Further, a notification is received indicating a new orientation for at least one of the plurality of subpanels. See operation 106. In one embodiment, the notification indicates, at a minimum, one of four orientations, where a first orientation is associated with a generally upright portrait orientation, a second orientation is associated a clockwise rotation from the first orientation to a landscape orientation, a third orientation is associated with an upside down portrait orientation, and a fourth orientation is associated a counter-clockwise rotation from the first orientation to a landscape orientation. In one embodiment, each of the four orientations represents an approximation of a physical orientation of the mobile device to the nearest ninety degrees. In other embodiments, the approximation of a physical orientation may comprise angular increments of less than ninety degrees to provide a finer approximation granularity. In certain embodiments, angular increments are substantially uniform, while in other embodiments, angular increments are non-uniform.

In addition, in response to the new orientation, the adjacent relationship is maintained, and an in-place rotation animation is generated for the two or more representative images, preserving the second relationship. See operation 108. For example, in one embodiment, a second screen may be found (non-visible) to the right of a visible home screen. Additionally, an icon may be found at the top left of the corner of the home screen. After the home screen is rotated from a portrait to a landscape orientation, the second screen may still be found (non-visible) to the right of the visible home screen. Further, the icon (previously found at the top left of the corner of the screen) may now be found on the bottom left corner of the screen (since the top left corner rotating to the left would correspond with the bottom left corner, assuming the screen is rotated in a counter clockwise manner) and rotated such that the object's orientation matches the orientation of the screen. In this manner, the adjacent relationship is maintained regardless of the orientation of the device, and the icon's location (e.g. based on the second relationship) is additionally maintained.

Figure 1B:
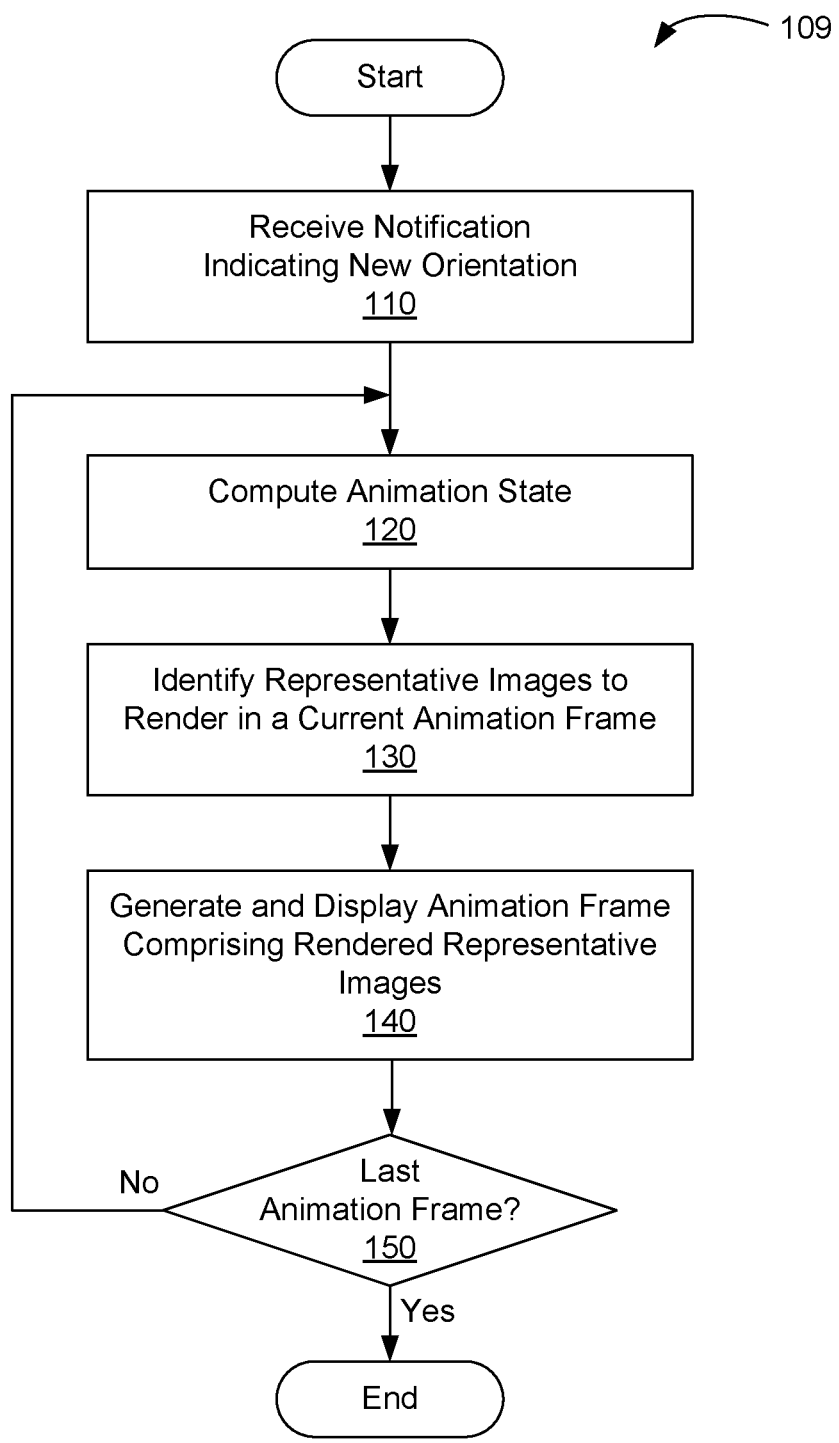
FIG. 1B illustrates a flow chart of a method for displaying a collection of representative images, according to one embodiment.

FIG. 1B illustrates a flow chart of a method 109 for displaying a collection of representative images, according to one embodiment. Although method 109 is described in conjunction with the systems of FIGS. 2A-2D, persons of ordinary skill in the art will understand that any system that performs method 109 is within the scope and spirit of presently disclosed embodiments. In one embodiment, a mobile device, such as mobile device 270 of FIGS. 2A-2D, is configured to perform method 109. Method 109 may be performed by executing a collection viewer, implemented as a software module or collection of software modules within the mobile device.

Method 109 begins in step 110, where the collection viewer receives a notification indicating that the mobile device has been repositioned into a new physical orientation. In one embodiment, physical orientation may be determined from measurements performed by a sensor device, such as one of sensor devices 242. For example, an accelerometer, comprising sensor devices 242, may provide a physical measurement of a force vector corresponding to physical forces on the mobile device. When mobile device is held generally still, such as when a user is holding the mobile device, this measured force vector is generally aligned with a gravity force vector. When the measured force vector is aligned vertically and pointing from the top of the mobile device to the bottom of the mobile device, the mobile device is likely being held in an upright portrait orientation. When the measured force vector is rotated by approximately ninety degrees about a normal vector to display unit 212, the device is likely being held in a landscape orientation, and so forth. While approximating orientation is described herein based on a measured force vector, other techniques of approximating orientation (physical orientation) may be performed without departing the scope and spirit of presently disclosed embodiments.

Any technically feasible technique may be implemented for sending a notification to the collection viewer. For example, the notification may comprise a message in an object message passing system. In this example, an instance of the collection viewer is configured to receive a new orientation message when the mobile device changes to a new orientation. A software module, such as a system service module, may be configured to approximate device orientation, for example, by monitoring an accelerometer within sensor devices 242. The new orientation message may specify a new orientation, or the new orientation message may specify that the device is in a new orientation and trigger the collection viewer to determine the new orientation. The new orientation message may indicate that the device has changed orientation beyond a specified angular threshold, enabling the collection viewer to determine an orientation for display, such as in embodiments that implement finer rotational granularity than ninety degree granularity. The system service module may include a kernel process configured to monitor hardware circuits comprising the sensor devices 242, an application programming interface (API) configured to respond to the kernel process, a process executing in application space that is configured to monitor sensor devices 242 and generate messages based on specified criteria, or any other technically feasible mechanism for providing orientation notifications to the collection viewer.

In one embodiment, hysteresis is applied to an orientation approximation, so that a change in physical orientation needs to surpass a certain rotational threshold to trigger generation of the notification of a new orientation. In such an embodiment, the system services module may apply hysteresis to physical orientation measurements so that a notification is generated only after a specified orientation threshold is exceeded. In other embodiments, the collection viewer may be configured to apply hysteresis to notifications, such as notifications for changes of less than ninety degrees or, alternatively, less than an orientation change threshold (e.g., 60 degrees).

In step 120, the collection viewer, or a helper function to the collection viewer, computes a current animation state for a current animation sequence. A current animation sequence may include a scroll animation, a rotation animation, a zoom animation, or a combination thereof triggered by a physical change in device orientation. A given current animation sequence may be initiated in response to receiving notification of an orientation change that is sufficient to trigger a displayed change in orientation. In one embodiment, the current animation sequence defines a sequence of frames, as discussed in greater detail below in FIG. 3E. In one embodiment, a given animation sequence (e.g. the current animation sequence) may be completed before a subsequent animation sequence is initiated. The current animation state may define any combination of a current zoom level, a current scroll position, and a current rotation angle for a collection of representative images being animated in the current animation sequence. The current animation state may determine which representative images are visible within view panel 311. An animation sequence for in-place rotation of representative images may be configured to include scroll animation concurrently with the rotation animation. In this way, a user may initiate a scroll animation, physically rotate the mobile device, and observe representative images rotating in their proper place given that they are also undergoing a scroll animation.

In step 130, the collection viewer, or a helper function to the collection viewer, identifies representative images to render in a current animation frame. Any technically feasible technique may be used to identify representative images to render. In one embodiment, only visible representative images are identified to render in the current frame. In one embodiment, a visible representative image includes geometry that intersects at least one pixel within view panel 311. In another embodiment, visible representative images and at least one non-visible representative image are identified to render in a current animation frame. In one embodiment, when a representative image is newly visible in a current animation frame (e.g. by scrolling or rotating into view panel 311), that representative image is instantiated for display and the instantiated representative image instance is sent a message to render an associated representative image according to the current animation state. Other representative image instances may be sent a substantially similar message to render an associated representative image according to the current animation state. In certain embodiments, a representative image instance that is no longer visible is de-allocated at the completion of the animation sequence.

In step 140, the collection viewer, or a helper function to the collection viewer, generates and displays an animation frame comprising rendered representative images. In one embodiment, the animation frame includes one rendered representative image. In another embodiment, the animation frame includes two or more rendered representative images. Each rendered representative image includes a representative image that has been translated, rotated, zoomed, or any combination thereof in accordance with the current animation state. Each generated animation frame may comprise an arbitrary number of different rendered representative images that are composited together for display as the animation frame. In one embodiment, only visible rendered representative images are generated. In other embodiments, one or more non-visible rendered representative images are also generated. For example, certain representative images may be positioned just outside an edge of view panel 311. Various pixels from these representative images may be visible in some animation frames during a rotation animation but not visible in all animation frames of the rotation animation. For such scenarios, detailed per-pixel visibility testing may be advantageously avoided by simply generating a rendered representative image and allowing a compositing operation used to generate a given animation frame to resolve which pixels, if any, are visible. At least a portion of each rendered representative image may be presented within view panel 311 during a display time for each animation frame where the rendered representative image is at least partially visible. In one embodiment, the generated animation frame is displayed on display unit 212 of FIG. 2A. In one embodiment, each animation frame is rendered by a graphics processing unit (GPU) within processor complex 210 of FIG. 2B.

If, in step 150, the current animation frame is the last animation frame, then the method terminates. Otherwise, the method proceeds back to step 120.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
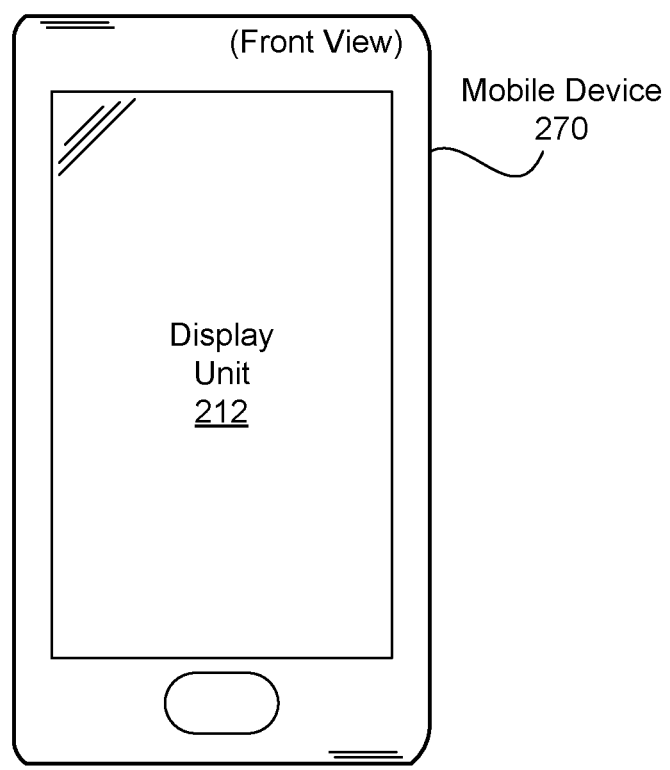
FIG. 2A illustrates a front view of a mobile device comprising a display unit, according to one embodiment.

FIG. 2A illustrates a front view of a mobile device 270 comprising a display unit 212, according to one embodiment. Display unit 212 is configured to display user interface (UI) elements associated with software applications configured to execute on mobile device 270. The UI elements may include representative images, such as file icons, digital images and/or digital photos (or simply "images"), and image thumbnails. In one embodiment, an image thumbnail includes an image that depicts a digital still photo, digital image, digital video, an application, a media object, and/or any other digital media item. A given representative image may have an arbitrary shape and may include a cropped and/or scaled version of an image being depicted.

In one embodiment, the file icons may depict files, applications, and/or other digital objects. The file icons may be displayed within a home screen view presented by an operating system or by a launcher module, such as a file launcher application. A given file icon may be associated with an application that is configured to execute when the icon is selected by a user, such as by a touch input gesture. For example, a given file icon may be associated with one or more data files that may be "opened" when the file icon is selected by the user, said selection causing an associated application to be executed to open one or more of the data files for user access. The user access may include, without limitation, reading, viewing, browsing, listening to, and/or editing data associated with the one or more data files. A file icon may be positioned for display relative to other file icons by a user, such as by selecting and dragging the icon into position. Alternatively, the file icon may be positioned according to an automatic sorting system, such an alphabetical (e.g., by file name) sorting system. In one embodiment, applications and/or data files are automatically organized sequentially in groups, with each group containing file names (e.g., application names, data file names) that start with the same letter, symbol, Unicode character, Unicode letter, or Unicode glyph.

In another embodiment, the UI elements may include representative images, such as preview images. Said representative images may include image thumbnails, video thumbnails, and more generally representative depictions of data file content. The representative images may be presented in a browser, such as a thumbnail browser or file browser. When the user selects a representative image, such as by a touch gesture, the browser may open, display, or otherwise play content associated with the representative image. In one embodiment, the preview images may include a reduced resolution of a full frame image In yet another embodiment, the UI elements may include an image viewer. The image viewer may be configured to display multiple images organized as a montage. Each of the multiple images may be displayed in various sizes and/or shapes. In one embodiment, the montage may be organized along a chronological sequence or time line. The time line may depict a story line having notes, metadata, and other content such as audio content, video content, location information, hyperlink information, digital content associated with a geo-location, digital content associated through proximity to another mobile application, or any combination thereof.

In certain embodiments, the UI elements may include a zoom function, such as a zoom-in function (e.g., operable from a pinch-out touch gesture) and zoom out function (e.g., operable from a pinch-in touch gesture). For example, a user may perform a zoom gesture to zoom in on a display region displaying a specific set of one or more representative images that may be of interest to the user. Should the user rotate mobile device 270, representative images being displayed will rotate in place and continue to appear upright and in their original locations relative to a physical display screen of mobile device 270. Furthermore, the display region will continue to display the same set of one or more representative images regardless of device orientation. The presently disclosed operations for rotating representative images in place in response to changes in device orientation provide dynamic and intuitive zoom operations, wherein a user may use intuitive pinch to zoom gestures at any time or location when interacting with the UI.

In one embodiment, presently disclosed operations solve an issue where systems reposition icons and thumbnails on a device display screen in response to changes in device orientation, said reposition operations thereby precluding useful pinch and zoom operations for UI subsystems configured to display icons and thumbnails. Additionally, presently disclosed operations improve a scenario where users select a global icon display size (e.g., small, medium, large) or a global display size for UI elements, but such global settings do not give users dynamic, intuitive control over how they browse icons and/or thumbnails. As such, the present disclosed operations in one embodiment, seek to resolve the situation where a user is forced to leave a current visual application context (e.g., a thumbnail browser or a home screen) to change a global setting to adjust icon or thumbnail size, after which the user needs to reestablish the visual application context to perform additional operations. Additionally, the presently disclosed operations, in one embodiment, may be used to improve efficiency where accomplishing a zoom operation may occur by changing a global icon or thumbnail size (which may be inefficient when compared to techniques disclosed herein for directly performing zoom operations (e.g., zoom gesture)). The techniques disclosed herein advantageously provide for greater efficiency by creating a consistent view of various representative images and/or other UI elements regardless of zoom level and device orientation. This greater efficiency may improve power consumption for mobile device 270 because fewer operations and less operating time are needed to accomplish the same user goal or goals.

Figure 2B:
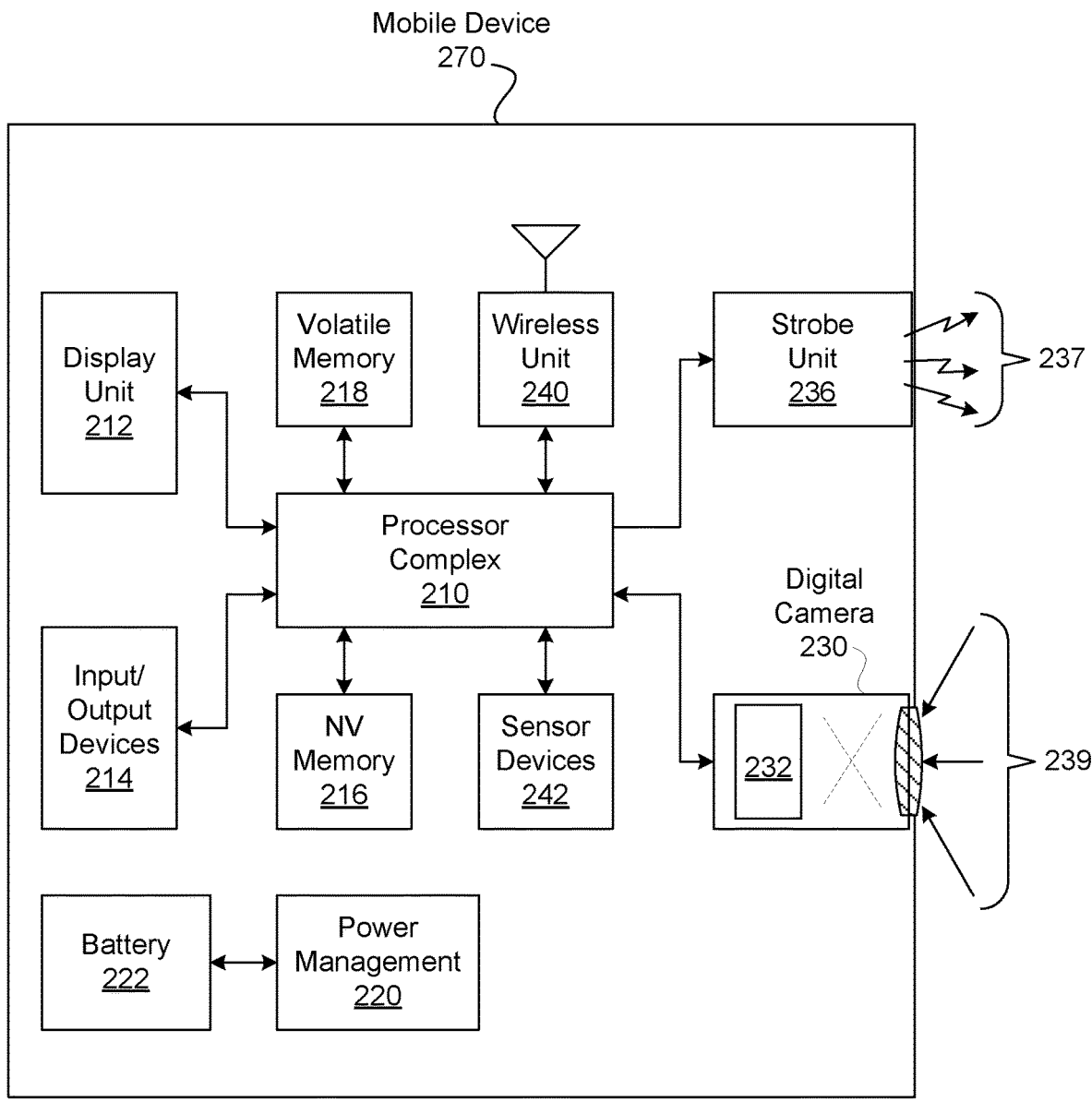
FIG. 2B illustrates a block diagram of a mobile device comprising a display unit, according to one embodiment.

FIG. 2B illustrates a block diagram of mobile device 270, according to one embodiment. Mobile device 270 includes a processor complex 210 coupled to display unit 212. Mobile device 270 may also include, without limitation, a digital camera 230, a strobe unit 236, a set of input/output devices 214, non-volatile memory 216, volatile memory 218, a wireless unit 240, and sensor devices 242, each coupled to processor complex 210. In one embodiment, a power management subsystem 220 is configured to generate appropriate power supply voltages for each electrical load element within mobile device 270, and a battery 222 is configured to supply electrical energy to power management subsystem 220. Battery 222 may implement any technically feasible battery, including primary or rechargeable battery technologies. Alternatively, battery 222 may be implemented as a fuel cell, or high capacity electrical capacitor.

In one usage scenario, strobe illumination 237 comprises at least a portion of overall illumination in a scene being photographed by digital camera 230. Optical scene information 239, which may include strobe illumination 237 reflected from objects in the scene, is focused onto an image sensor 232 as an optical image. Image sensor 232, within digital camera 230, generates an electronic representation of the optical image. The electronic representation comprises spatial color intensity information, which may include different color intensity samples for red, green, and blue light.

Display unit 212 is configured to display a two-dimensional array of pixels to form a digital image for visual display. Display unit 212 may comprise a liquid-crystal display, an organic LED display, or any other technically feasible type of display. Input/output devices 214 may include, without limitation, a capacitive touch input surface, a resistive tablet input surface, buttons, knobs, or any other technically feasible device for receiving user input and converting the input to electrical signals. In one embodiment, display unit 212 and a capacitive touch input surface comprise a touch entry display system, and input/output devices 214 comprise a speaker and microphone.

Non-volatile (NV) memory 216 is configured to store data when power is interrupted. The NV memory 216 therefore implements a non-transitory computer-readable medium. In one embodiment, NV memory 216 comprises one or more flash memory devices. NV memory 216 may be configured to include programming instructions for execution by one or more processing units within processor complex 210. The programming instructions may include, without limitation, an operating system (OS), user interface (UI) modules, imaging processing and storage modules, and modules implementing one or more embodiments of techniques taught herein. In particular, the NV memory 216 may be configured to store instructions that implement method 109 of FIG. 1. The instructions, when executed by processing units within processor complex 210, cause the processing units to perform method 109. One or more memory devices comprising NV memory 216 may be packaged as a module that can be installed or removed by a user. In one embodiment, volatile memory 218 comprises dynamic random access memory (DRAM) configured to temporarily store programming instructions, image data, and the like needed during the course of normal operation of mobile device 270. Sensor devices 242 include sensors configured to detect at least device orientation of the mobile device 270. For example, sensor devices 242 may include an accelerometer to detect motion and orientation, an electronic gyroscope to detect motion and orientation, or a combination thereof. Sensor devices 242 may also include, without limitation, a magnetic flux detector to detect orientation, a global positioning system (GPS) module to detect geographic position, or any combination thereof.

Wireless unit 240 may include one or more digital radios configured to send and receive digital data. In particular, wireless unit 240 may implement wireless standards known in the art as "WiFi" based on institute for electrical and electronics engineers (IEEE) standard 802.11, and may implement digital cellular telephony standards for data communication such as the well-known "3G" and long term evolution ("LTE"), or "4G" or "5G" suites of standards. In one embodiment, mobile device 270 is configured to transmit one or more digital photographs residing within either NV memory 216 or volatile memory 218 to an online photographic media service via wireless unit 240. In such an embodiment, a user may possess credentials to access the online photographic media service and to transmit the one or more digital photographs for storage and presentation by the online photographic media service. The credentials may be stored or generated within mobile device 270 prior to transmission of the digital photographs. The online photographic media service may comprise a social networking service, photograph sharing service, or any other web-based service that provides storage and download of digital photographs. In certain embodiments, mobile device 270 is configured to receive one or more incoming digital photographs via wireless unit 240, and store the incoming digital photographs in the NV memory 216, or the volatile memory 218, or a combination thereof. In one embodiment, mobile device 270 is configured to receive and render a web page through a browser application, which is configured to perform, without limitation, at least one of the methods 100, 109, and 400 to provide a spatially consistent depiction of content by rotating representative images associated with the web content in place. More generally, any of the techniques disclosed herein may be implemented within any browser function, including a thumbnail browser, an image browser and/or montage browser, a file browser, and web browser. Further, any of the techniques disclosed herein may be implemented within any collection viewer (which may also comprise a browser function, etc.).

Figure 2C:
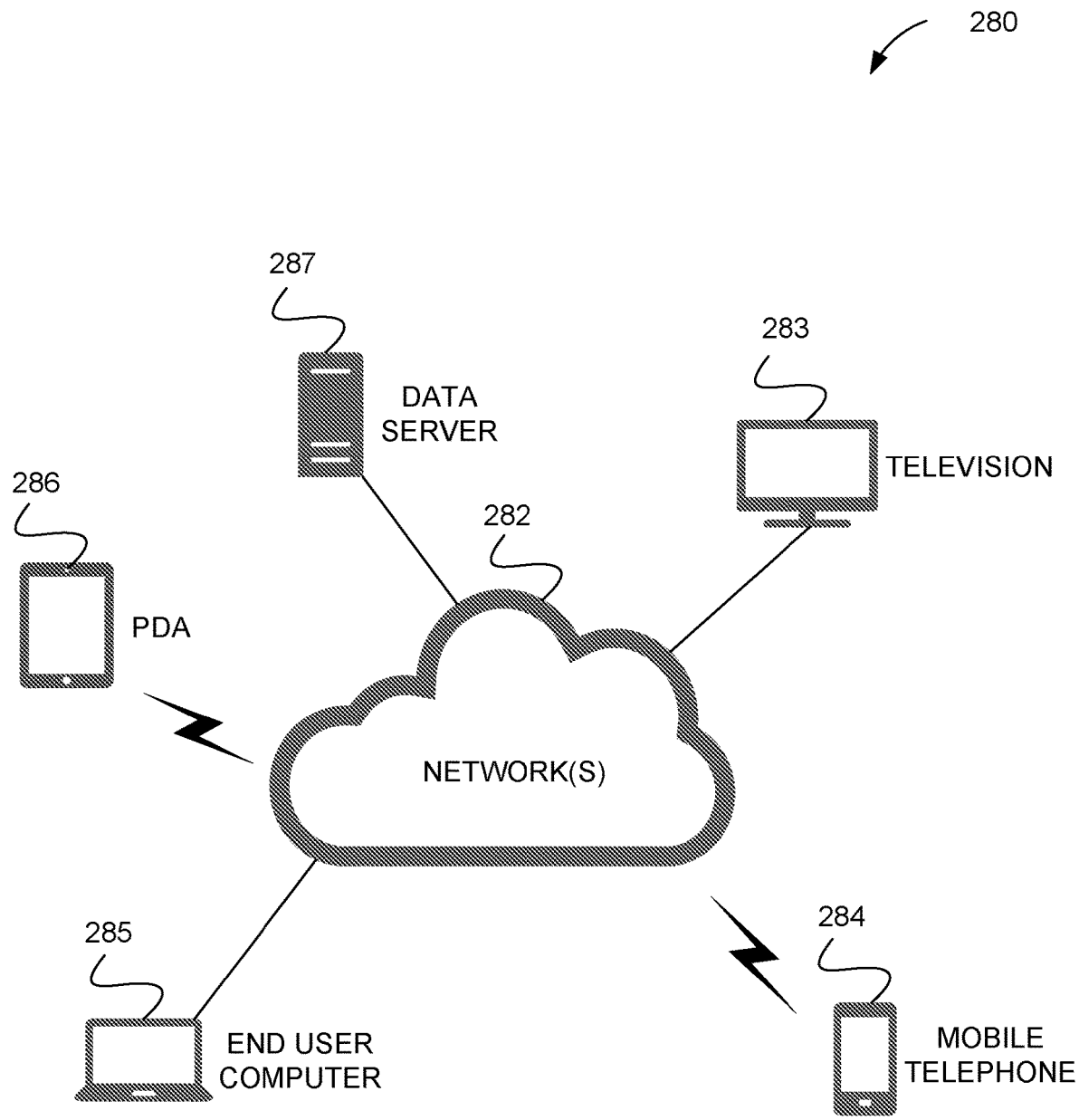
FIG. 2C illustrates a network architecture, in accordance with one possible embodiment.

FIG. 2C illustrates a network architecture 280, in accordance with one possible embodiment. As shown, at least one network 282 is provided. In the context of the present network architecture 280, the network 282 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 282 may be provided.

Coupled to the network 282 is a plurality of devices. For example, a server computer 1012 and an end user computer 285 may be coupled to the network 282 for communication purposes. Such end user computer 285 may include a desktop computer, lap-top computer, and/or any other type of logic. Still yet, various other devices may be coupled to the network 282 including a personal digital assistant (PDA) device 286, a mobile phone device 284, a television 283, etc. In one embodiment, mobile phone device 284 may comprise a smartphone, configured to implement one or more features of mobile device 270. In another embodiment, PDA 286 is configured to implement one or more features of mobile device 270.

In one embodiment, a data server 287 is coupled to various devices through network 282. The devices may include one or more of television 283, mobile telephone 284, end user computer 285, and PDA 286. Data server 287 may provide, without limitation, cloud storage, cloud data services, and/or web page presentation of data to the devices.

Figure 2D:
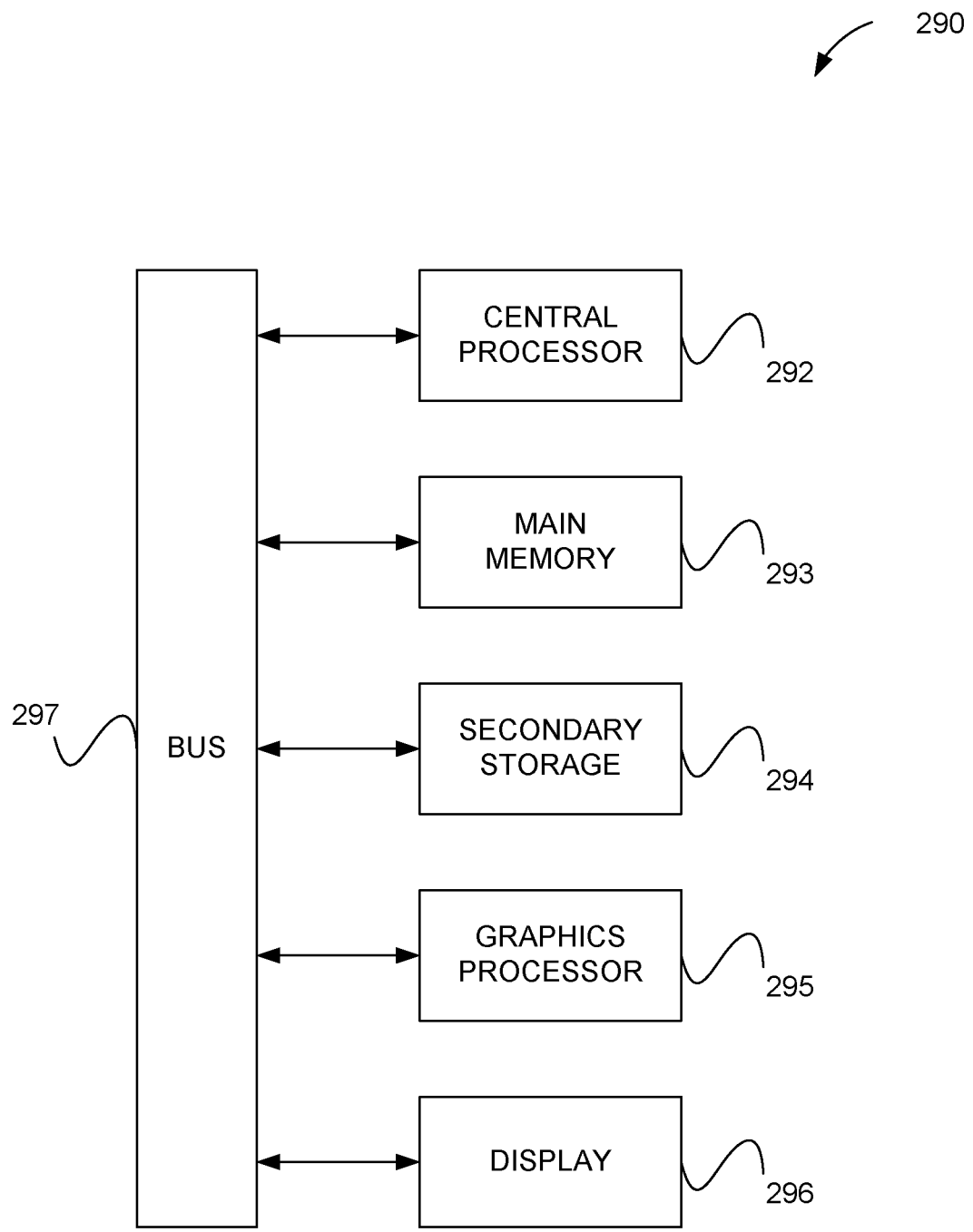
FIG. 2D illustrates an exemplary system, in accordance with one embodiment.

FIG. 2D illustrates an exemplary system 290, in accordance with one embodiment. As an option, the system 290 may be implemented in the context of any of the devices of the network architecture 290 of FIG. 2C. Of course, the system 290 may be implemented in any desired environment.

As shown, a system 290 is provided including at least one central processor 292 which is connected to a communication bus 297. The system 290 also includes main memory 293 [e.g. random access memory (RAM), etc.]. The system 290 also includes a graphics processor 295 and a display 296.

The system 290 may also include a secondary storage 294. The secondary storage 294 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 293, the secondary storage 294, and/or any other memory, for that matter. Such computer programs, when executed, enable the system 290 to perform various functions (as set forth above, for example). Main memory 293, secondary storage 294 and/or any other storage are possible examples of non-transitory computer-readable media.

Figure 3A:
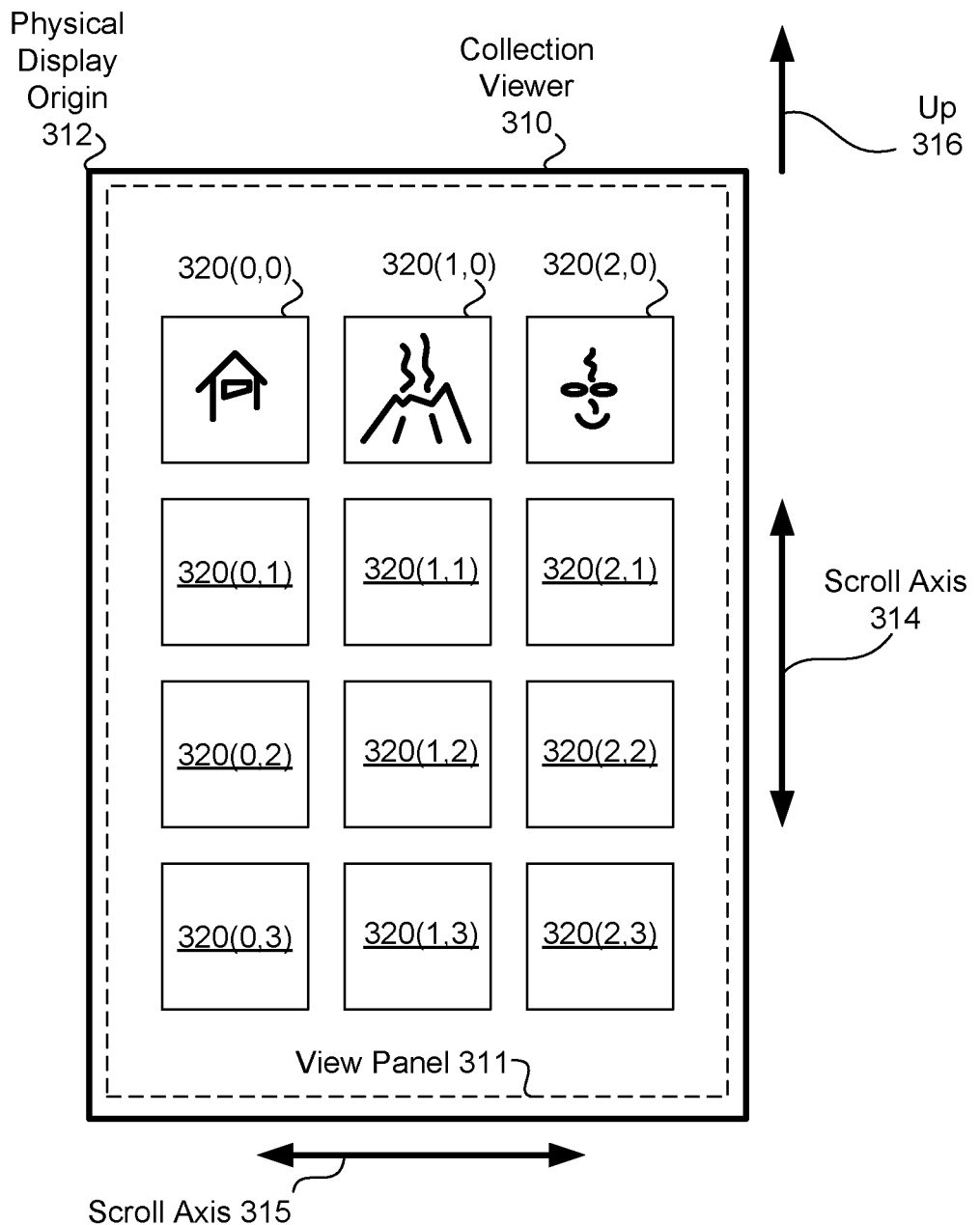
FIG. 3A illustrates a collection viewer configured in a portrait orientation, according to one embodiment.

FIG. 3A illustrates a collection viewer 310 configured in a portrait orientation, according to one embodiment. As shown, collection viewer 310 is aligned in orientation with that of a mobile device, such as mobile device 270, so that when the mobile device is in a portrait orientation collection viewer 310 is also in a portrait orientation, and when the mobile device is in a landscape orientation collection viewer 310 is also in a landscape orientation. As a consequence, a given dimension of a display screen included in the mobile device may always correspond with an associated dimension of collection viewer 310 being displayed on the display screen. In certain embodiments, the display screen may be sized as a non-square rectangle and a larger dimension of the display screen may correspond with a larger dimension of collection viewer 310. In another embodiment, the collection viewer 310 may be aligned independent of the orientation of the mobile device 270. For example, the collection viewer may change orientation based on a manual input (e.g. from a user, etc.), a sensor input (e.g. accelerometer, gyroscope, etc.), etc.

A physical display origin 312 may be disposed, for example, in an upper left corner, and a scroll axis 314 may be aligned along a larger dimension of the display screen, so that scroll axis 314 is aligned vertically when collection viewer 310 is in a portrait orientation as shown. That is, the scroll axis 314 is generally aligned with respect to a physical "up" direction 316 when collection viewer 310 is in a portrait orientation. While physical display origin 312 is shown in the upper left corner, any technically suitable physical location (e.g., any of the other three corners) may serve as a physical display origin. A second scroll axis 315 may be orthogonal to scroll axis 314. In this way, scroll axis 315 may be aligned horizontally when collection viewer 310 is in a portrait orientation as shown. Scroll axis 314 and scroll axis 315 each provide a reference axis for performing gesture-based commands. Such commands may include, without limitation, touch-based gestures, such as touch to select, swipe to scroll/pan, and pinch to zoom gestures.

In one embodiment, collection viewer 310 allows a user to scroll a collection of representative images 320, along scroll axis 314 in response to an input scroll command. The collection of representative images 320 may be organized in a grid, with a portion of the representative images 320 visible within a view panel 311. A swipe gesture performed on a capacitive input device within display unit 212 may serve as the input scroll command. In one embodiment, view panel 311 is configured to have a rectangular form, including a larger dimension and a smaller dimension. In such an embodiment, the term "portrait orientation" refers to an orientation for view panel 311 with the larger dimension generally oriented along the up direction 316. The term "landscape orientation" refers to an orientation for view panel 311 with the smaller dimension generally oriented along the up direction 316. In other embodiments, view panel 311 may be square. In such embodiments, "portrait orientation" and "landscape orientation" comprise arbitrary but orthogonal orientations of view panel 311.

In one embodiment, a user may scroll representative images 320 only along scroll axis 314. In another embodiment, the user may scroll representative images 320 only along scroll axis 315. In yet another embodiment, the user may scroll representative images 320 along both scroll axis 314 and scroll axis 315. In embodiments that provide scrolling along both along scroll axis 314 and scroll axis 315, representative images may be organized along a contiguous 2D surface, or organized as a set of subpanels, illustrated in greater detail below.

While collection viewer 310 is illustrated here as a UI element having a view panel 311, the term "collection viewer" is defined broadly herein to include a software module configured to generate the UI element and display representative images 320 within view panel 311.

When a user rotates mobile device 270 into a new position, the collection viewer may reconfigure presentation of representative images 320 by causing the representative images 320 to rotate to an angle consistent with the new position. For example, the user may initially hold mobile device 270 in a portrait orientation. The user may then rotate mobile device 270 into a landscape orientation. In this example, mobile device 270 may detect a sufficient change in orientation angle and cause collection viewer 310 to transition from a portrait orientation to a landscape orientation, illustrated below in FIG. 3B. Detecting a sufficient change in orientation angle may include a hysteresis function applied to device orientation. In the present context, a hysteresis function may be defined to be a threshold function with an output orientation state that depends on both a current input orientation angle and a current output orientation. In various embodiments, the output orientation state may change after the current input orientation angle changes by more than hysteresis threshold. Thus, detecting device orientation with a hysteresis function may exhibit the property of requiring an orientation angle to overcome a hysteresis threshold as a condition for detecting an orientation change from portrait orientation to landscape orientation, or vice versa. For example, if the hysteresis threshold is defined to be forty-five degrees and the current orientation is a portrait orientation, then the current orientation angle may need to rotate clockwise by at least forty-five degrees (from vertical, the current output orientation) for the hysteresis function to report an orientation change in the clockwise direction, such as to detect an orientation change from portrait to landscape in the clockwise direction. Once the device is deemed to be in landscape orientation (current output orientation se to landscape), the current orientation angle needs to rotate counterclockwise by at least forty-five degrees towards vertical for the hysteresis function to then report an orientation in the counterclockwise direction (to portrait orientation). In other embodiments, different orientations may be implemented according to arbitrary angles having finer granularity than, for example, orthogonal angles. Detecting a sufficient change may include detecting angular changes in device orientation consistent with the angular granularity. Furthermore, any other technically feasible techniques may be implemented for detecting device orientation without departing the scope and spirit of the present disclosure.

Figure 3B:
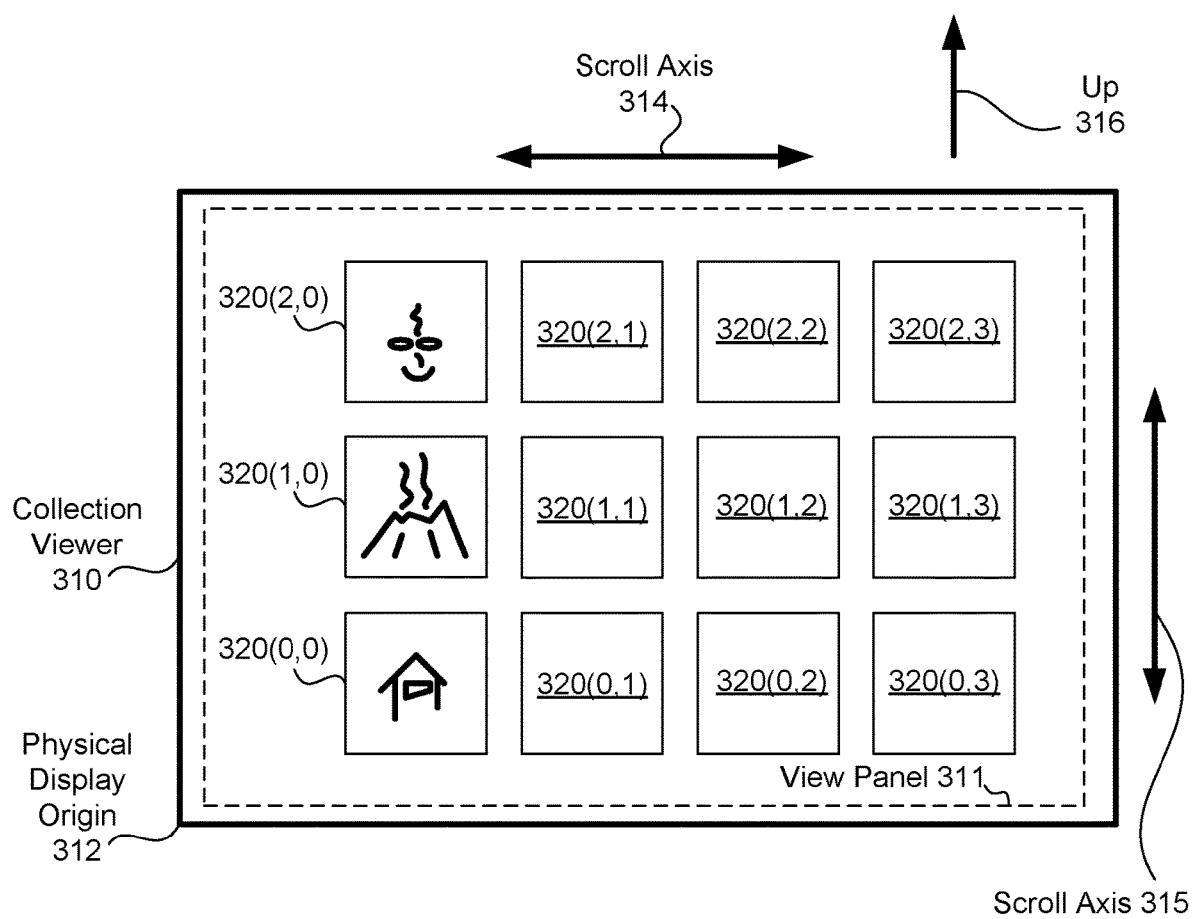
FIG. 3B illustrates a collection viewer configured in a landscape orientation, according to one embodiment.

FIG. 3B illustrates collection viewer 310 configured in a landscape orientation, according to one embodiment. This configuration of a landscape orientation may be the result of rotating a mobile device counterclockwise by ninety degrees (clockwise by two-hundred seventy decrees) from the portrait orientation illustrated previously in FIG. 3A. As shown, the physical display origin 312 is disposed in a lower left corner, and scroll axis 314 is aligned horizontally. In this landscape configuration, scroll axis 315 is aligned vertically along physical "up" direction 316. Of course, in other embodiments, the physical display origin 312 may be disposed in another predetermined corner (e.g. bottom right, bottom left, top right, top left, etc.) or in another predetermined position (e.g. axis point, rotation point, etc.).

In a typical usage scenario, a user holds their head in a physically upright position, and therefore prefers to view representative images 320 rendered according to the physical up direction 316. As shown, representative images 320 are rotated to be viewed in an orientation consistent with the up direction 316. In one embodiment, representative images 320 are rotated in place when device orientation is changed between portrait and landscape orientation. In one embodiment, rotation in place comprises performing an animation, such as a rotation animation, fade animation, or other transition animation, for each representative image 320. In one embodiment, animation for all representative images 320 is performed substantially synchronously, so that all displayed representative image 320 appear to move together. By rotating representative images 320 in place, collection viewer 310 is able to present a physical metaphor of the representative images 320 that is consistent with a physical device rotation. For example, the relative position of representative image 320(0,0) to the physical origin 312 is maintained regardless of changes in device orientation. Similarly, other representative images 320 maintain respective relative positions relative to physical origin 312, and therefore relative positions to each other. When a user rotates the mobile device between portrait and landscape orientations, each representative image 320 remains visually in place relative to physical origin 312, thereby preserving the UI metaphor of a data object (app, data file, etc) being represented as a representative image (e.g., an icon). By contrast, prior art systems typically rearrange thumbnails, leading to user confusion and breaking any perceived consistency with physical device rotation.

Figure 3C:
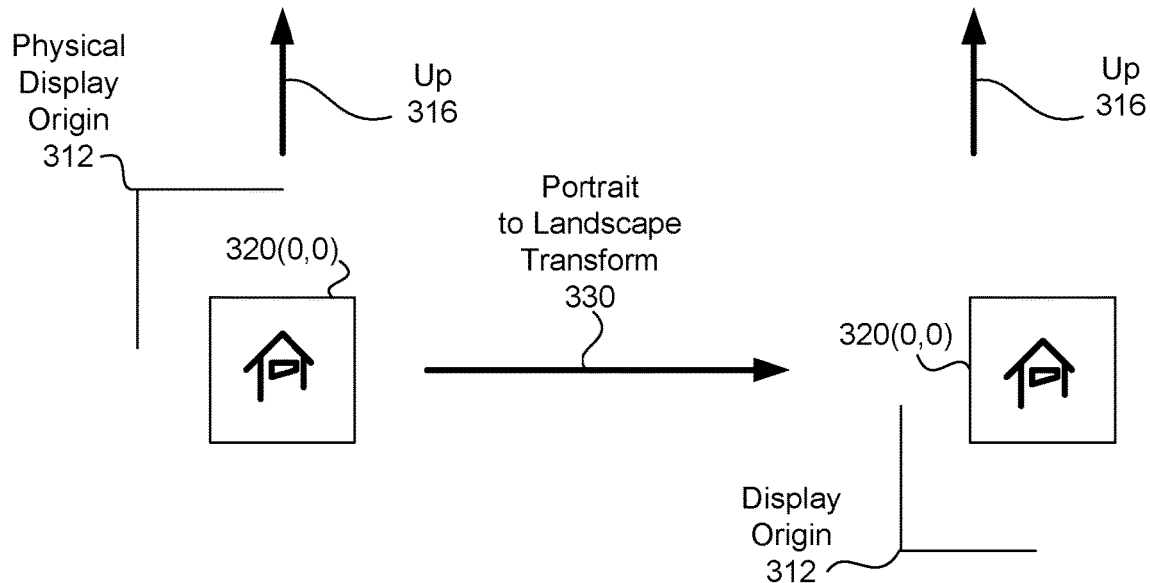
FIG. 3C illustrates one representative image in two different orientations as viewed by a user with respect to a physical up direction, according to one embodiment.

FIG. 3C illustrates representative image 320(0,0) of FIG. 3A in two different orientations as viewed by a user, according to one embodiment. A portrait to landscape transform 330 is implemented to animate a clockwise rotation of representative image 320(0,0) from a portrait orientation to a landscape orientation. Additional transforms may be similarly implemented to animate transitions between each different discrete rotation position. Here, representative image 320(0,0) is rotated ninety degrees in a clockwise direction to compensate for a ninety degree counter-clockwise rotation of a mobile device. Note that representative image 320(0) remains at a fixed offset with respect to physical display origin 312. As shown, representative image 320(0,0) is rotated to be viewable in a generally upright orientation regardless of orientation of the mobile device, while preserving a fixed offset with respect to physical display origin 312. In other embodiments, finer-grain discrete rotation positions may be similarly implemented.

Figure 3D:
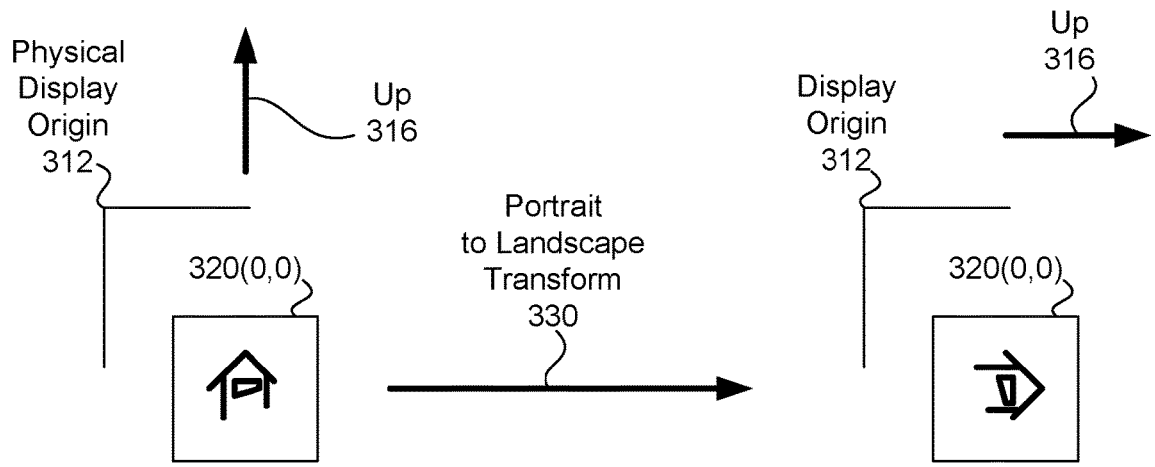
FIG. 3D illustrates one representative image in two different orientations with respect to a physical display origin, according to one embodiment.

FIG. 3D illustrates representative image 320(0,0) in two different orientations with respect to the physical display origin 312 of FIG. 3A, according to one embodiment. As described above, portrait to landscape transform 330 implements a rotation of representative image 320(0,0). As shown, representative image 320(0,0) is rotated to compensate for mobile device rotation, while preserving a fixed offset relative to physical display origin 312.

Figure 3E:
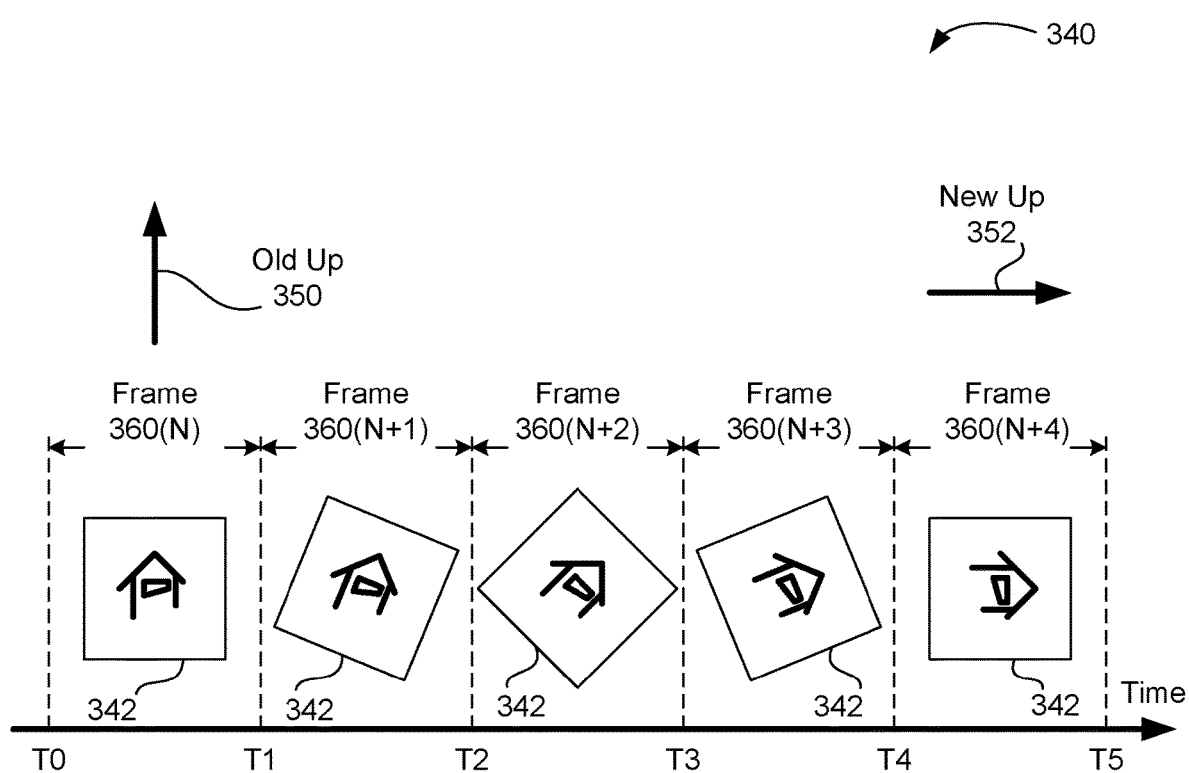
FIG. 3E depicts an animation sequence of frames for one representative image transitioning between two different orientations, according to one embodiment.

FIG. 3E depicts an animation sequence 340 of frames 360 for one representative image 342 transitioning between two different orientations, according to one embodiment. As shown, representative image 342 is rotated in sequential frames 360(N) to 360(N+4) to generate a rotation animation of representative image 342. The rotation animation depicts a rotational movement of the representative image 342 from an initial position at time T0, to a new position at time T4. In this example, a user rotates a mobile device (e.g. mobile device 270) counter-clockwise from a portrait orientation to a landscape orientation between time T0 and time T1, thereby triggering a clockwise animation of representative image 342. In the process, a new physical up direction is established. A new up direction 352 consequently replaces an old up direction 350. The animation sequence depicts rotational movement of representative image 342 to generally negate the physical rotation of mobile device. In one embodiment the animation sequence is timed independently of physical rotation once a rotation event is detected. Furthermore, in certain embodiments the rotation animation may be triggered only after a hysteresis threshold for rotation has been met. In other embodiments, the animation sequence is timed to substantially track physical rotation once a rotation event is detected. In certain embodiments, a rotation event comprises detecting a rotational change larger than a predetermined angle in at least one of three orthogonal (e.g. 90 degree, etc.) angles, or a rotational change larger than a predetermined angle for a normal vector from the mobile device display screen. While detecting an orientation change is described generally herein, any technically feasible technique for detecting a transition between portrait orientation and landscape orientation may be implemented without departing the scope and spirit of the presently disclosed embodiments.

Representative image 342 may be rendered in each rotational position associated with each incremental frame 360. Although three intermediate frames 360(N+1), 360(N+2), and 360(N+3) are shown, animation sequence 340 may include an arbitrary number of intermediate frames. In one embodiment, animation sequence 340 is initiated and completed during a time span of less than one second, but more than ten milliseconds. In certain implementations, a duration for animation sequence 340 may be configured to be an integral multiple of a number of frame times needed to display intermediate frames as video refresh frames on a display screen (e.g., display unit 212 of FIGS. 2A and 2B) included in the mobile device. In one embodiment, each representative image being displayed within view panel 311 is animated substantially synchronously, so that each animation step for each representative image is completed together. For example, animation frame 360(N+1) may be rendered and displayed at or before time T2 for each representative image 320 of FIG. 3A. In other embodiments, looser synchronization may be implemented, so that each representative image 220 completes a respective animation sequence within a specified maximum number frame times, such as less than five frame times, or less than sixty frame times. In certain embodiments, an animation sequence models certain physical behaviors or properties, such as momentum, oscillation, friction, and the like. For example, an animation sequence may depict the representative images overshooting their rotation and springing back into proper position. An arbitrary rotation function may be applied with respect to time to provide these kinematic effects (and others) to the animation sequence.

In alternative embodiments, transition effects other than a rotation animation may be implemented. For example, one alternative transition effect is an alpha fade animation between representative image 342 depicted in frame 360(0) and representative image 342 depicted in frame 360(N+4). Another alternative transition effect animates representative image 342 depicted in frame 360(0) collapsing to a dot and re-emerging as representative image 342 depicted in frame 360(N+4). These and other in-place transition effects may be implemented without departing the scope and spirit of the presently disclosed embodiments.

In one embodiment, frames 360 are rendered by a graphics processing unit (GPU) within processor complex 210 of FIG. 2B. Furthermore, each representative image within a given view panel may be rendered individually by the GPU at a current animation angle (given by a current animation state). The individually rendered representative images may then be composited together by the GPU to form one frame (e.g., video frame) for display. Each frame 360 may be similarly generated following the steps of rendering each representative image at a current animation angle, followed by compositing the rendered representative images together to form one frame for display.

While the techniques disclosed herein are described in conjunction with a mobile device, persons skilled in the art will recognize that any compute platform may be configured to perform these techniques.

Figure 3F:
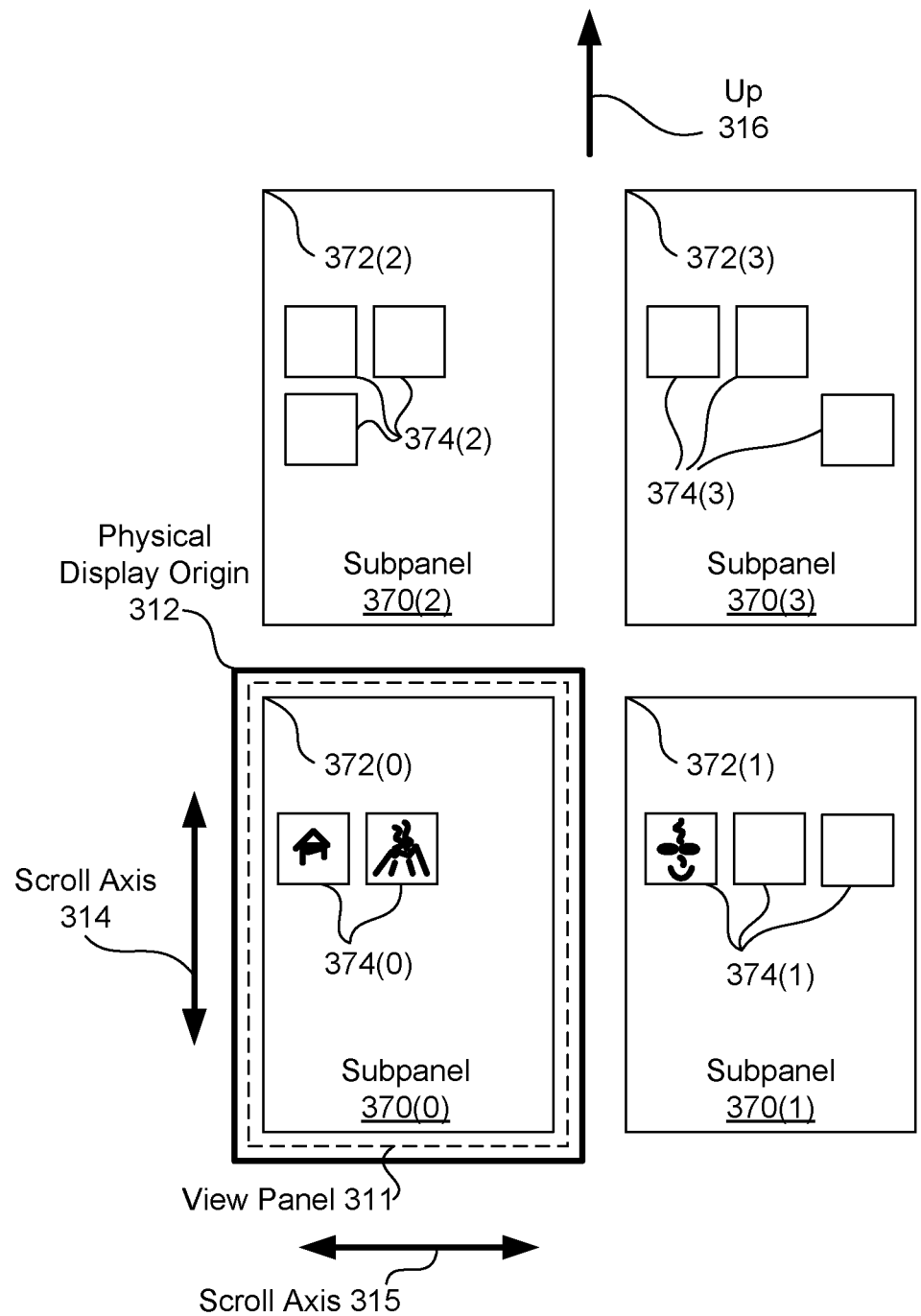
FIG. 3F depicts a set of subpanels in a portrait orientation, in accordance with an embodiment.

FIG. 3F depicts a set of subpanels 370 in a portrait orientation, in accordance with an embodiment. As shown, the subpanels 370 are arranged in a fixed relationship to each other. The fixed arrangement shown here positions subpanel 370(0) to the left of subpanel 370(1) and subpanel 370(0) below subpanel 370(2). Furthermore, subpanel 370(0) is positioned in the bottom left corner and subpanel 370(3) is positioned in the upper right corner.

In one embodiment, view panel 311 comprises a UI element displayed within a portion of the display screen of the mobile device. View panel 311 may be generated by a collection viewer. A physical display origin 312 is shown located at the upper left corner of the display screen. In other embodiments, the physical display origin may be disposed in a different location of the display screen. As shown, subpanel 370(0) is currently visible within the view panel 311. A user may provide a command, such as a swipe gesture, to move the subpanels relative to view panel 311 to select a different subpanel 370 to be visible. For example, the user may provide a left swipe gesture to select subpanel 370(1) to be visible. In this way, the collection viewer may provide a metaphorical representation of the subpanels, where the subpanels are depicted as physical objects that may be moved using swipe gestures.

Figure 3G:
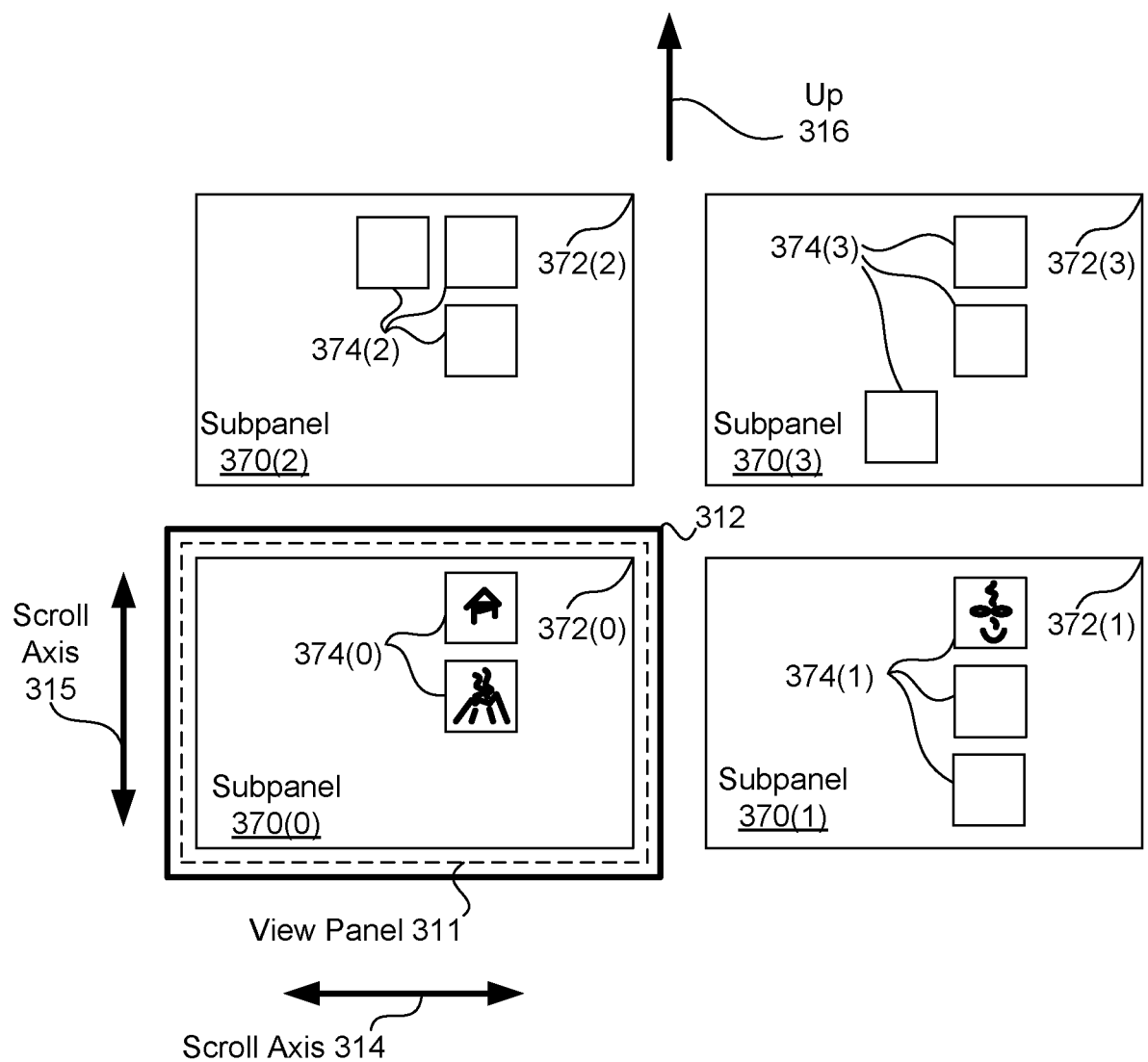
FIG. 3G depicts a set of subpanels in a landscape orientation, in accordance with an embodiment.

As shown, each subpanel 370 includes a local origin 372. A local origin 372 defines an origin for a local coordinate system within a given subpanel 370. When a given subpanel 370 rotates relative to the up direction 316 (e.g., as illustrated in FIG. 3G), representative images 374 within the subpanel may substantially maintain their offset position relative to the local origin 372. A local origin 372 associated with a subpanel 370 that is visible within view panel 311 may follow physical display origin 312 as orientation changes. However, a different local origin 372 for a non-visible subpanel 370 will follow the rotation of the non-visible subpanel 370, as illustrated in FIG. 3G. Each local origin 372 is shown in the upper left corner of a respective subpanel; however, a local origin may be positioned in any technically feasible location relative to the geometry of an associated subpanel. Each subpanel may include a set of representative images 374 disposed at respective, fixed offsets relative to a corresponding local origin 372. For example, a set of representative images 374(0) includes individual representative images each located at a fixed offset relative to local origin 372(0).

In one embodiment, a swipe gesture to the left may cause subpanel 370(0) to pan to the left. For example, a pan animation may be triggered that depicts subpanels 370(0) and 370(1) panning to the left along scroll axis 315, bringing subpanel 370(1) into visibility for display within view panel 311. Similarly, a downward swipe gesture may cause subpanel 370(0) to pan down along scroll axis 314, and bringing subpanel 370(2) into visibility for display within view panel 311. Each pan animation may be implemented as a sequence of animation frames that depict incremental panning state. The panning animation may track a user finger position and the panning animation may exhibit momentum, for example if the user finger breaks contact with the display screen.

Panning between subpanels may cause certain representative images to become newly visible within view panel 311. Each of the newly visible representative images should be in a rotational position that is consistent with currently visible representative images. Furthermore, a pan animation may be partially complete when a rotation animation is triggered, causing the pan animation to operate concurrently with the rotation animation. Similarly, a rotation animation may be partially complete when a pan animation is triggered, causing the rotation animation to operate concurrently with the pan animation.

In one embodiment, animation state comprises rotation state and pan state and each animation frame within a sequence of frames are rendered according to at least the animation state. In certain embodiments, animation state further includes a zoom level and each animation frame may be rendered to further include the zoom level.

FIG. 3G depicts a set of subpanels 370 in a landscape orientation, in accordance with an embodiment. As shown, the fixed relationship of each subpanel 370 is preserved, so that subpanel 370(0) is still to the left of subpanel 370(1), subpanel 370(0) is still below subpanel 370(2), subpanel 370(0) is still in the bottom left corner, and subpanel 370(3) is still in the upper right corner. Furthermore, each fixed offset between each local origin 372 and each individual representative image within a given subpanel 370 is preserved. For example, fixed offsets between local origin 372(0) and individual representative images within the set of representative images 374(0) are preserved over transitions between portrait orientation and landscape orientation. Each representative image is rotated in place (e.g., through a sequence of animation frames), to maintain an upright appearance for display. In one embodiment, any transition between portrait orientation and landscape orientation triggers an animation sequence that causes each representative image to rotate into an upright appearance for display.

In one embodiment, a swipe gesture to the left may cause subpanel 370(0) to pan to the left. For example, a pan animation may be triggered that depicts subpanels 370(0) and 370(1) panning to the left along scroll axis 314, bringing subpanel 370(1) into visibility for display within view panel 311. Similarly, a downward swipe gesture may cause subpanel 370(0) to pan down along scroll axis 315, and bringing subpanel 370(2) into visibility for display within view panel 311. The relative position of each subpanel is preserved regardless of orientation and pan position. Furthermore, the offset position of each representative image within each subpanel 370 is preserved relative to a local origin 372 for a containing subpanel.

Figure 4:
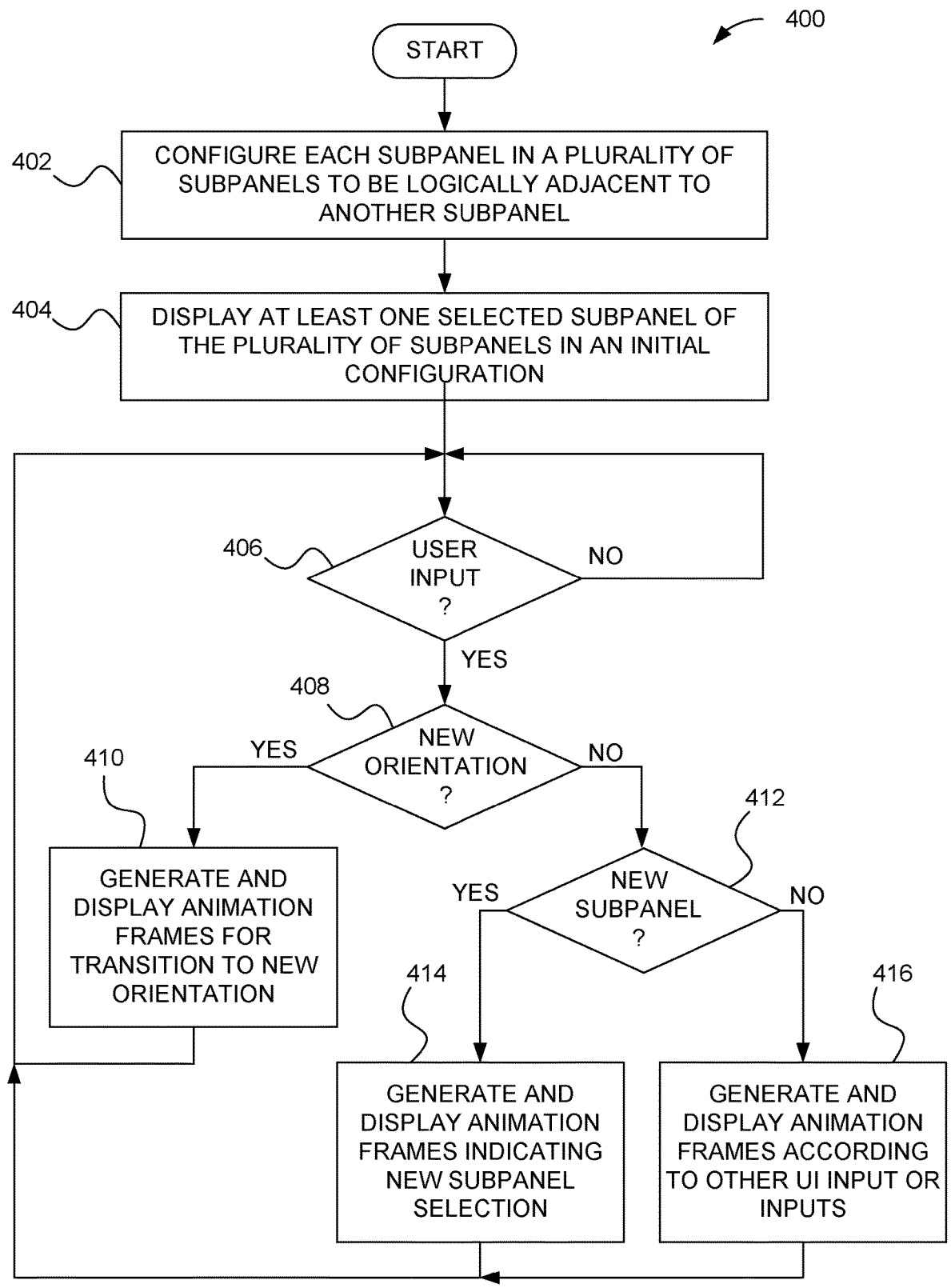
FIG. 4 illustrates a flow chart of a method for displaying subpanels for display, in accordance with an embodiment.

FIG. 4 illustrates a flow chart of a method 400 for displaying subpanels for display, in accordance with an embodiment. As an option, the method 400 may be implemented in the context of any one or more of the embodiments set forth in any previous and/or subsequent figure(s) and/or description thereof. For example, method 400 may apply in the context of the adjacent relationship of operation 102 of FIG. 1A. Of course, however, method 400 may be implemented in the context of any desired environment. Further, the aforementioned definitions may equally apply to the description below. In one embodiment, the method is performed by a mobile device, such as mobile device 270 of FIG. 2B.

As shown, each subpanel in a plurality of subpanels is configured to be logically adjacent to another subpanel within the plurality of subpanels. See operation 402. Each logically adjacent relationship between subpanels may reflect previously established positions for each subpanel. In one embodiment, subpanels are organized in a linear relationship so that the subpanels form a line of side-to-side panels. In another embodiment, subpanels may be organized into a linear relationship so that the subpanels form a line of top-to-bottom panels. In still another embodiment, each subpanel may be adjacent to different subpanel at one or more edges, so that a side-to-side linear relationship may exist between a first subpanel and a second subpanel; and, a top-to-bottom linear relationship may exist between the first subpanel and a third subpanel. In this way, the subpanels may form a completely or partially populated grid pattern, with each subpanel configured to include an arbitrary number of representative images (e.g., icons or thumbnails). In still yet another embodiment, a set of subpanels may form a line of subpanels, and each subpanel within the line may be part of an arbitrary line of different, non-intersecting subpanels. In such an embodiment a user may scroll side-to-side to select a subpanel, scroll up or down to select another subpanel, and then scroll side-to-side again within a different, non-intersecting space. In this way, a user may browse through a structure that is topologically equivalent to an arbitrary tree with arbitrary branches. Such an arrangement of subpanels may mirror an arbitrary directory structure.

Next, at least one selected (e.g., selected to be visible) subpanel of the plurality of subpanels is displayed in an initial configuration. See operation 404. As discussed before, a linear relationship may include a first subpanel being arranged next to a second (or other) subpanel in an adjacent manner. For example, if a first subpanel was centered (hypothetically), the second subpanel may be arranged at any point surrounding the first subpanel, and to switch from the first subpanel to a second subpanel (select the second subpanel), a user input may be received where a touch gesture indicates a straight motion from the direction of the second subpanel. Of course, the second subpanel may be arranged in any manner and made visible based on the linear relationship between the first subpanel and the second subpanel. Adjacent subpanels may optionally be aligned and positioned and aligned along a grid.

In decision 406, it is determined whether one of a set of specific forms of user input is received. In particular, it is determined whether a user input comprising an orientation change (e.g., mobile device is rotated between landscape and portrait orientation), subpanel selection command (e.g., a sufficiently long swipe gesture), scroll command (e.g., a shorter swipe gesture), or zoom command (e.g., a pinch gesture) is received. If it is determined that the specific form of user input is received, the method proceeds to decision 408.

In decision 408, it is determined whether the user input indicates a new orientation for the mobile device. Determining whether a new orientation is indicated for the mobile device may be performed according to the techniques described herein or using any technically appropriate technique. For example, in one embodiment, the orientation of a visible (e.g., selected) subpanel may change in response to at least one of the following: change in orientation of the display, change in orientation of the device, a change in orientation detected by sensors (e.g. gyroscope, accelerometer), etc. Additionally, if an orientation has changed, then such may be the basis for the notification per operation 106 of FIG. 1A. If it is determined that a new orientation is indicated, the method proceeds to operation 410. Otherwise, the method proceeds to decision 412.

Per operation 410, the mobile device generates and displays a plurality of animation frames for a detected transition to a new orientation. Each animation frame of the plurality of animation frames may include a plurality of individually rendered representative images composited together to form the animation frame. Each representative image may be rendered to animate a rotation operation for the representative image. A collection of representative images, including all visible representative images, may be rendered substantially synchronously (e.g. within milliseconds of each other, etc.) so that the collection of representative images appears to rotate together. Animation state for a given representative image may include rotation angle. The animation state may further include a scroll position, so that a rotation animation may be combined with a scroll (pan) animation. Such a combination may provide a more realistic physical metaphor through in-place rotation and panning with momentum. The animation state may still further include a zoom level, allowing a user to zoom in, rotate their device, and scroll through a zoomed region while preserving the physical metaphor of representative images as objects. In various embodiments, the rotation animation is performed according to the techniques described in FIGS. 1B, 3A-3G, 5, 6, 8, and 9.

In decision 412, it is determined whether the user input is a new subpanel selection command. If the user input is a new subpanel selection command the method proceeds to operation 414. Otherwise, the method proceeds to operation 416.

Figure 7:
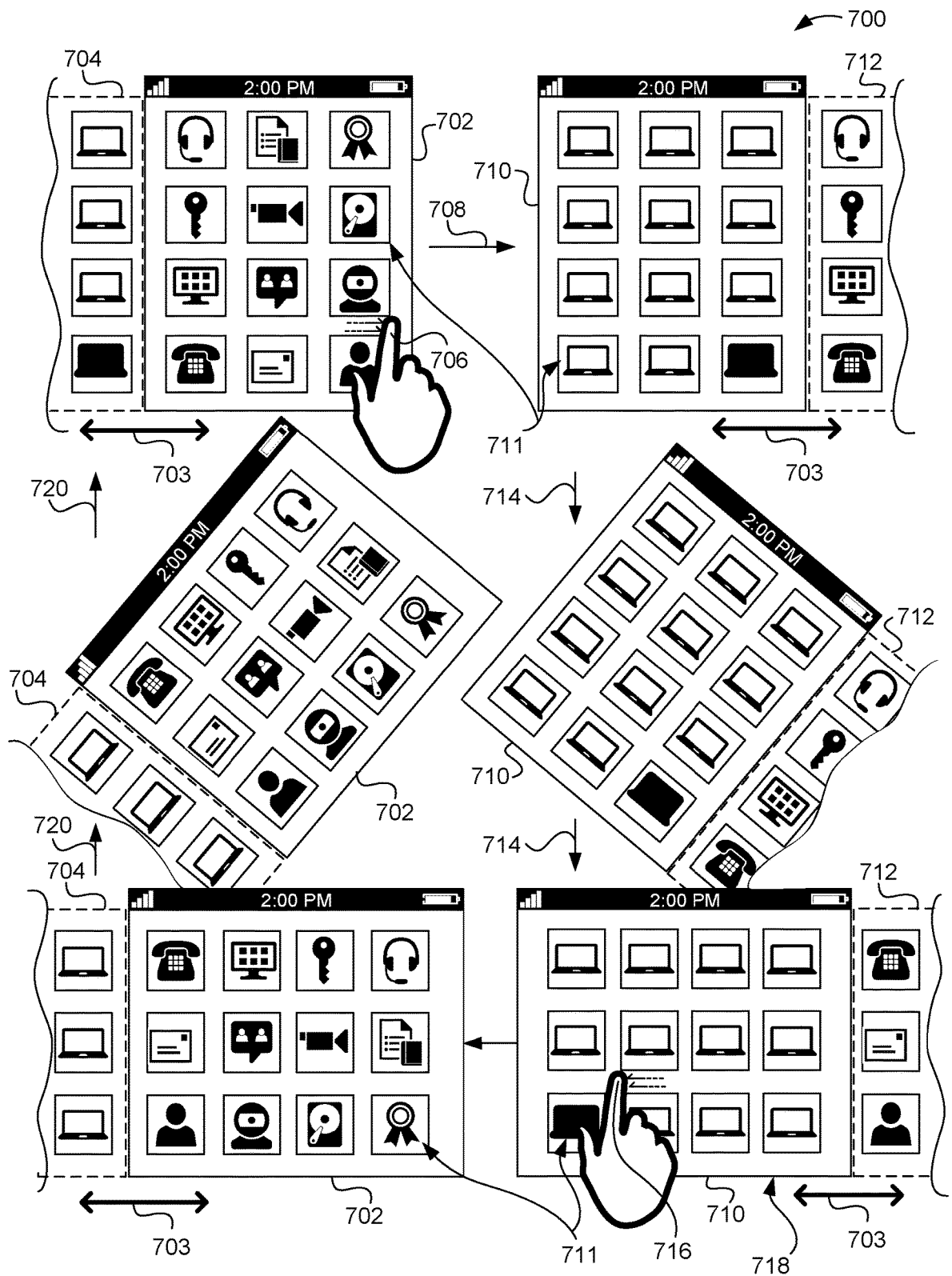
FIG. 7 illustrates a user interface flow for selecting one of a plurality of subpanels to be visible, according to one embodiment.

In operation 414, an animation comprising animation frames is generated and displayed indicating a new subpanel selection. For example, the animation may depict a first subpanel panning off screen and a newly selected subpanel panning into view for display. The animation may track a user swipe gesture so that the panning animation appears to follow a user's finger tip. This operation is illustrated in FIG. 7.

Figure 8:
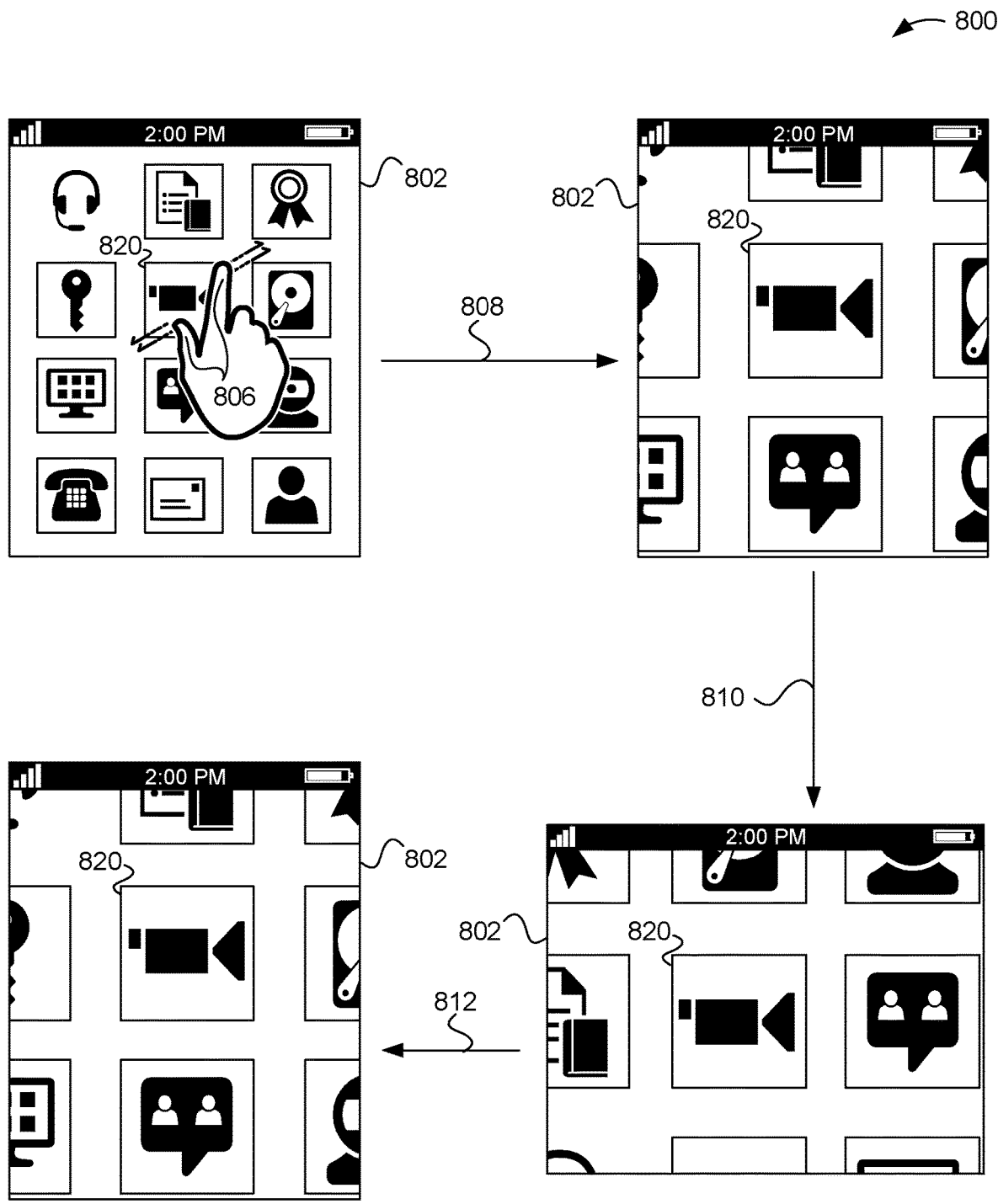
FIG. 8 illustrates a user interface flow for a zoom operation performed on a subpanel, according to one embodiment.

In operation 416, an animation comprising animation frames is generated and displayed to depict a panning or zooming operation within a subpanel. A zooming operation followed by a rotation operation is illustrated in FIG. 8.

If the orientation has not changed per decision 406, or after operation 410 completes or after operation 414 completes or after operation 416 completes, the method proceeds back to decision 406.

Figure 5:
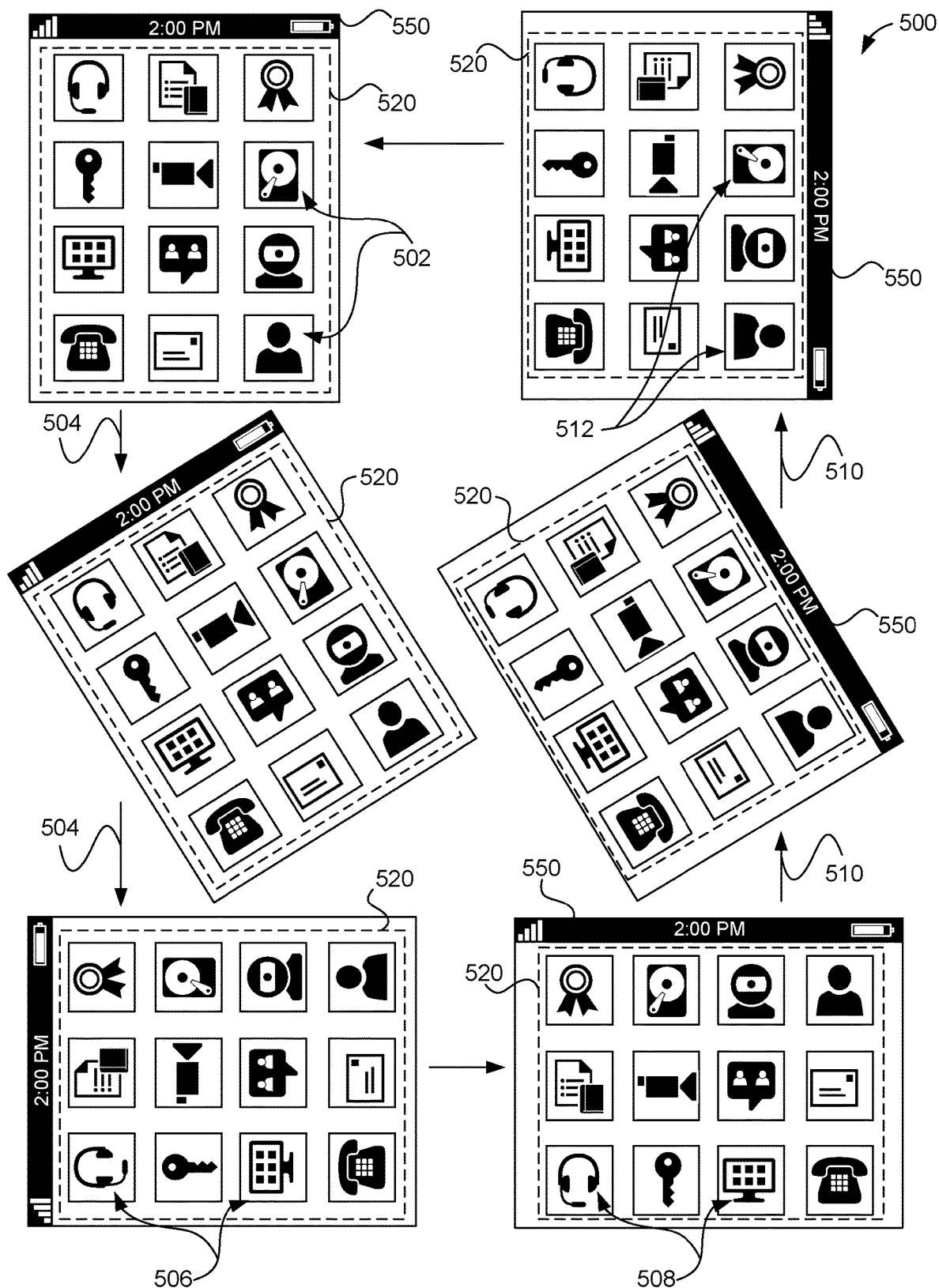
FIG. 5 illustrates a user interface flow applied to a subpanel, in accordance with an embodiment.

FIG. 5 illustrates a user interface flow 500 applied to a subpanel 520, in accordance with an embodiment. As shown, subpanel 520 is a visible subpanel. Other subpanels (not shown) may exist in logically adjacent positions to subpanel 520. As an option, the user interface flow 500 may be implemented in the context of any one or more of the embodiments set forth in any previous and/or subsequent figure(s) and/or description thereof. For example, the user interface flow 500 may apply in the context of the adjacent relationship of operation 102 of FIG. 1, and/or the changing the orientation per decision 408 of FIG. 4. Of course, however, the user interface flow 500 may be implemented in the context of any desired environment. Further, the aforementioned definitions may equally apply to the description below.

As shown, user interface flow 500 includes a first set of icons within the subpanel 520 in a first orientation 502. A first change in orientation 504 of a mobile device (e.g., the user rotates the mobile device) may cause the first set of icons to be displayed in a second orientation 506. After the change in orientation 504, and after the icons are displayed in a second orientation 506, due to physical rotation of the mobile device, an animation sequence (e.g. of video frames) for the first set of icons commences such that the icons rotate to a third orientation 508 to match the orientation of the mobile device. Of course, in an alternative embodiment, the third orientation 508 may be displayed immediately after concluding the change in orientation 504. In one embodiment, the third orientation 508 may match the first orientation 502 for each icon.

Additionally, in response to a second change in orientation 510, the icons are displayed in a fourth orientation 512, after which an animation sequence for the first set of icons commences such that the icons rotate back to the first orientation 502.

In this manner, the icons may be rotated to match the rotation of the display. Additionally, rather than re-organizing all such icons on the screen, the icons retain the same location on the device and simply rotate in place at the conclusion of the change in orientation of the device.

A user interface associated with user interface flow 500 may include an information bar 550. Information bar 550 may be configured to display information such as, and without limitation, wireless signal strength, time of day, and battery charge state. In one embodiment, information bar 550 is configured to be displayed on a top horizontal edge of a mobile device display screen as shown. Information bar 550 may be moved from a previously horizontal edge to a newly horizontal edge at any point during or after a change in orientation (e.g., during change in orientation 504, 510). The moving may be implemented using any technique without departing embodiments of the present disclosure. For example, information bar 550 may fade from a previously horizontal edge and materialize at a newly horizontal edge. In another example, information bar 550 may be depicted as sliding from a previously horizontal edge to a newly horizontal edge over a sequence of animation frames. In other embodiments, information bar 550 remains on a fixed edge of the display screen regardless of orientation (see example in FIG. 10).

Figure 6:
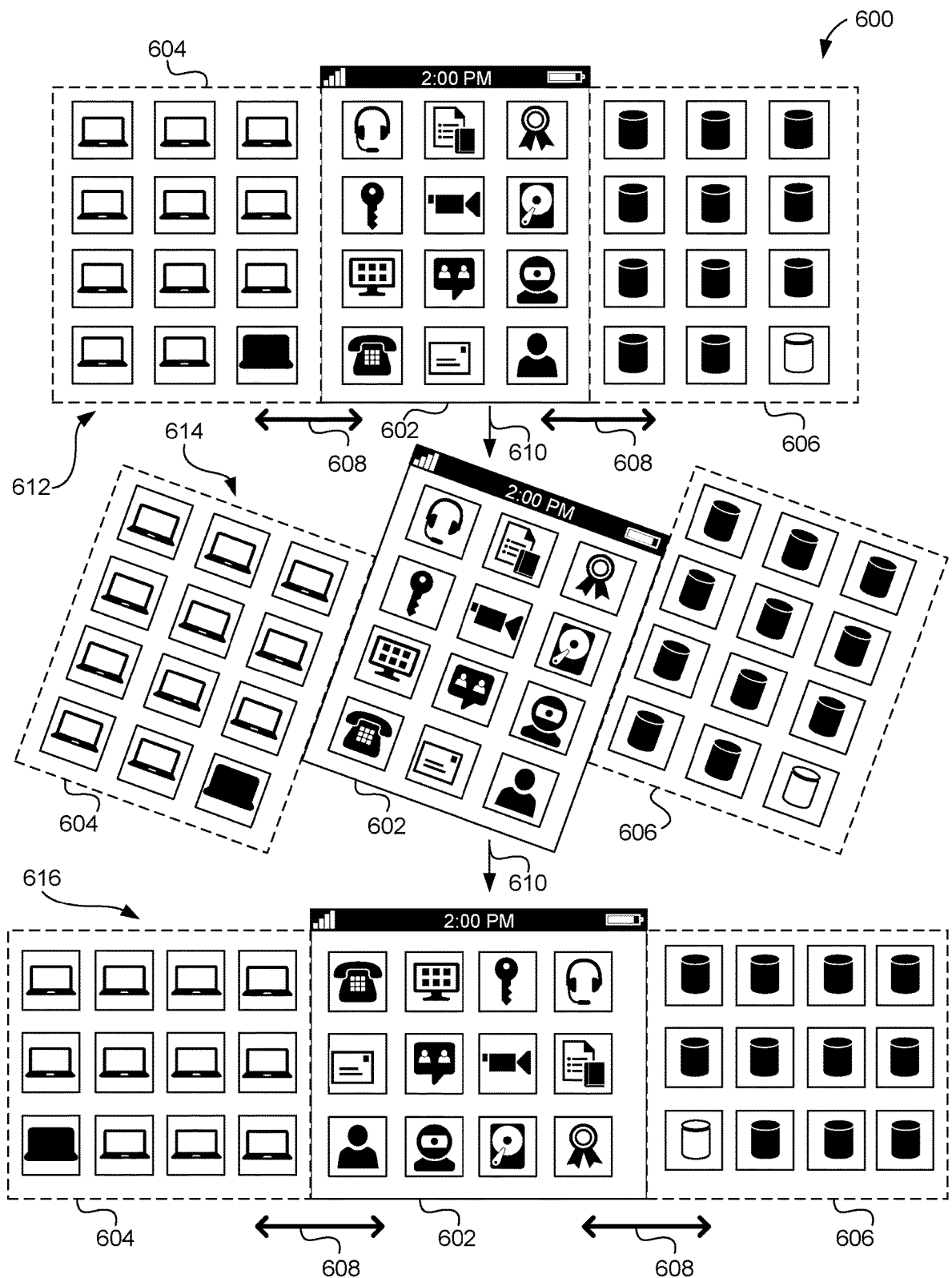
FIG. 6 illustrates a user interface flow for changing orientation of a plurality of subpanels, according to one embodiment.

FIG. 6 illustrates a user interface flow 600 for changing orientation of a plurality of subpanels, according to one embodiment. As an option, the user interface flow 600 may be implemented in the context of any one or more of the embodiments set forth in any previous and/or subsequent figure(s) and/or description thereof. For example, the user interface flow 600 may apply in the context of the adjacent relationship of operation 102 of FIG. 1A, the changing the orientation per decision 408 of FIG. 4, and the animation sequence 500 of FIG. 5. Of course, however, the user interface flow 600 may be implemented in the context of any desired environment. Further, the aforementioned definitions may equally apply to the description below.

As shown, a mobile device may include a first subpanel 602 in a first orientation 612 as well as a second subpanel 604 and a third subpanel 606. Additionally, a linear orientation 608 (per the adjacent relationship of operation 102) is in a left-to-right orientation between subpanels 602-606. In other words, subpanel 604 is adjacent to subpanel 602, and subpanel 602 is adjacent to subpanel 606. Further, a change in orientation 610 between the first orientation 612 and a third orientation 616 is shown.

In one embodiment, the change in orientation 610 may include a second orientation 614. Additionally, the second orientation 614 may continue to maintain the linear orientation 608 between subpanels 602-606. In this manner, subpanel 604 remains to the left of subpanel 602, and subpanel 606 remains to the right of subpanel 602 even during the change in orientation.

After the completion of the change in orientation 610, the third orientation 616 is displayed. Additionally, the third orientation 616 may continue to maintain the linear orientation 608 between subpanels 602-606. In this manner, subpanel 604 remains to the left of subpanel 602, and subpanel 606 remains to the right of subpanel 602. Of course, linear orientation 608 may be in any direction (as opposed to just left-to-right type orientation). In another embodiment, the linear orientation is maintained from a first orientation 612 to a third orientation 616.

FIG. 7 illustrates a user interface flow 700 for selecting one of a plurality of subpanels to be visible, according to one embodiment. As an option, the user interface flow 700 may be implemented in the context of any one or more of the embodiments set forth in any previous and/or subsequent figure(s) and/or description thereof. For example, the user interface flow 700 may apply in the context of the adjacent relationship of operation 102 of FIG. 1, the changing the orientation per decision 408 of FIG. 4, the animation sequence 500 of FIG. 5, and the user interface flow 600 of FIG. 6. Of course, however, the user interface flow 700 may be implemented in the context of any desired environment. Further, the aforementioned definitions may equally apply to the description below.

As shown, a visible first subpanel 702 is shown and a non-visible second subpanel 704 is shown (i.e. surrounded by dotted line). In response to a first user action 706 (i.e. swiping from left to right), a first user interface change 708 occurs, where the visible portion of the screen now displays visible second subpanel 710 and non-visible first subpanel 712 is shown to the side (surrounded by dotted line). Additionally, linear orientation 703 shows that the linear (e.g., adjacent) relationship between the visible first subpanel 702 and non-visible second subpanel 704, as well as between visible second subpanel 710 and non-visible first subpanel 712, is a left-to-right linear orientation, or right-to-left linear orientation, respectively. Further, icons 711 are represented on the visible first subpanel 702, the non-visible second subpanel 704, the visible second subpanel 710, and the non-visible first subpanel 712. As described herein, specific icons contained within visible first subpanel 702 are also contained within non-visible first subpanel 712, and specific icons contained within non-visible second subpanel 704 are also contained within visible second subpanel 710. In one embodiment, an orientation of the icons 711 is dependent on the orientation of a subpanel (e.g. subpanels 702-4, 710-12). In another embodiment, an orientation of the icons 711 may be dependent on another trigger (e.g. orientation of the mobile device, input from a sensor, etc.).

In response to a first change in orientation 714, the visible second subpanel 710 (and non-visible first subpanel 712) is rotated to a new orientation 718. In the new orientation 718, the visible second subpanel 710 and non-visible first subpanel 712 maintain the same linear orientation 703. Additionally, the icons 711 are rotated consistent with the orientation of the subpanel. Further, the physical placement of icons 711 on a physical display screen coincides with the placement of such icons 711 prior to the first change in orientation 714. In other words, if an icon was originally in the bottom right hand corner (as shown in visible second subpanel 710), and if the device was turned clockwise (as shown in first change in orientation 714), then the same icon would be found on the bottom left corner after the first change in orientation 714.

Additionally, in response to a second user action 716 (i.e. swiping from right to left), the display is modified such that the visible first subpanel 702 is made visible and a non-visible second subpanel 704 is made non-visible. After such action, the same linear orientation 703 is maintained.

Next, in response to a second change in orientation 720, the visible first subpanel 702 and non-visible second subpanel 704 are displayed in an orientation that corresponds with the original orientation.

In one embodiment, during the first change in orientation 714 and the second change in orientation 720, the linear relationship 703 may be maintained between the visible second subpanel 710 and non-visible first subpanel 712, and between the visible first subpanel 702 and non-visible second subpanel 704, respectively.

Of course, in one embodiment, rather than receive a first user action 706 and second user action 716, the device and/or display may be utilized in any manner to facilitate switching between one user interface and another, including, but not limited to, gaze detection, use of sensors (e.g. gyroscope, accelerometer), gesture control, etc.

FIG. 8 illustrates a user interface flow 800 for a zoom operation performed on a subpanel 802, according to one embodiment. As shown, subpanel 802 includes at least icon 820. Initially, subpanel 802 may be displayed at an initial zoom factor, such as a default zoom factor. A user zoom action 806 causes a UI zoom operation 808 to be performed, during and/or after which a portion of subpanel 802 is displayed according to a different zoom factor. As shown, icons, including icon 820, within subpanel 802 are displayed larger (higher zoom factor) after the UI zoom operation 808 is performed to increase zoom factor. In certain usage modes, displaying larger icons may assist certain users to be able to discern the icons better. Furthermore, any text associated with the icons (not shown), such as file or application names, may be displayed according to a prevailing zoom factor (e.g., the higher zoom factor) to assist users in reading the text. A user may only need to zoom in briefly to view the icon and/or associated test, and may then zoom back out. For example, a user may zoom in on a particular icon (e.g., icon 820) to read a file name for the icon and then zoom back out to a default zoom level for the subpanel.

A first change in orientation 810 (e.g., a counterclockwise rotation of ninety degrees) may cause subpanel 802 to be displayed as rotated into a new (landscape) orientation. As shown, icon 820 (and others) rotated in place to compensate for the new device orientation. As shown, icon 820 is also displayed at a higher zoom factor because of the user zoom action and rotated in place because of the first orientation change 810. A second orientation change 810 (a clockwise rotation of ninety degrees) may cause subpanel 802 to be displayed in the original portrait orientation.

In one embodiment, the disclosed system seeks to improve zoom operations in file/icon browsers which may require a user to navigate to a system control tool, set the overall UI zoom level to a higher zoom level using the system control tool, view an icon and/or text at a higher zoom level, and then, optionally return to the system control tool and set the overall UI zoom level back to a default level. In the process, the user may lose their place in the file/icon browser. To avoid this and other issues, some users compromise on usability and simply set the overall UI zoom level higher (larger icons and larger text) than they actually prefer in order to facilitate occasionally reading certain items, but the user may need to set the zoom level down to view certain documents or web pages properly. In each case, UI zoom operations in file/icon browsers are inefficient both from a usability perspective as well as in system performance measures such as run time (and therefore power consumption) needed to complete an operation or set of operations requested by the user, all of which may be improved by the embodiments disclosed herein.

Furthermore, in one embodiment, the zoom system may be used to improve upon systems where zoom operations within a file/icon browser may cause an icon of interest to be potentially lost during an orientation change (mobile device rotation) due to a file/icon browser re-shuffling the screen position of each icon, thereby forcing the user to search for the icon of interest. Still yet, in another embodiment, icons being displayed may not be rotated to compensate for device orientation, making such systems difficult to use, all of which may be improved by the embodiments disclosed herein. Further, embodiments disclosed herein allow the user to zoom in and out freely and efficiently, as well as change the orientation of a mobile device while preserving a user's upright view of an icon of interest.

The above described operations preserve the screen location and upright display of an icon of interest, while allowing the user to freely perform zoom and pan operations as well as device orientation changes. A user may also pan freely, and preserve the screen location of the icon of interest through rotation operations and/or additional zoom operations. Embodiments disclosed herein preserve the physical metaphor of icons as objects and allow the user to advantageously perform UI operations with greater simplicity and efficiency compared to conventional systems.

Techniques disclosed herein may be implemented together in any combination including, without limitation, arbitrary combinations of rotating representative images in place, zooming in and out, panning, and selecting different subpanels for display. Furthermore, various embodiments may implement different forms and organizations of representative images and subpanel behavior, as described below in FIGS. 9 and 10.

Figure 9:
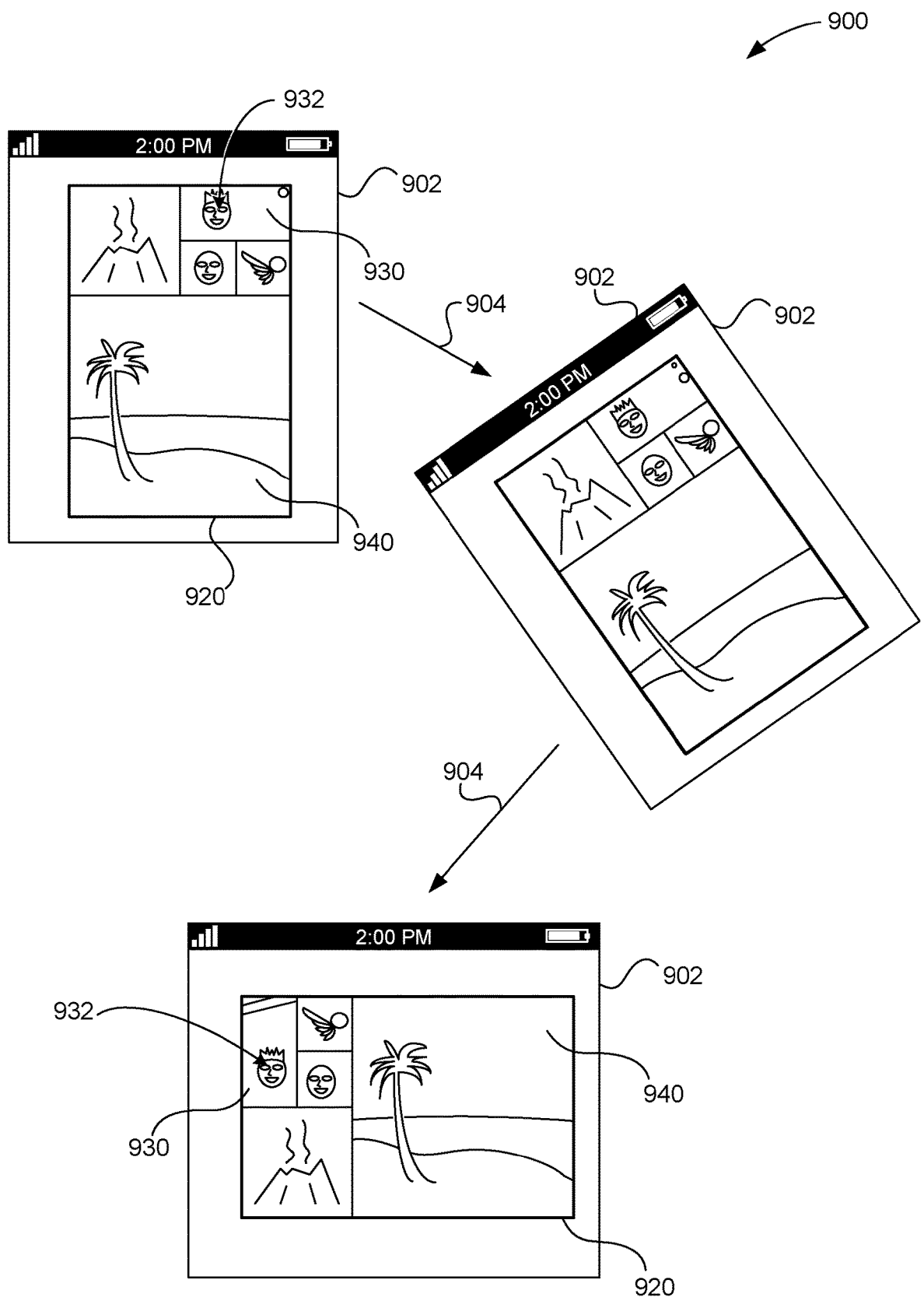
FIG. 9 illustrates a user interface flow for a subpanel comprising a photo montage, according to one embodiment.

FIG. 9 illustrates a user interface flow 900 for a subpanel 902 comprising a photo montage 920, according to one embodiment. As shown, subpanel 902 is configured to display the photo montage 920, which may comprise an arbitrary set of digital images, such as digital photos. Each of the digital images may have an arbitrary form factor, with a cropping function applied to the form factor for display within a photo montage image. For example, photo 930 may have an arbitrary form factor, and may be cropped for display within an associated rectangular form factor as shown; and photo 940 may also have an arbitrary form factor and may be cropped for display with a square form factor as shown.

In one embodiment, photo montage 920 comprises at least a portion of a subpanel. The subpanel may be configured to function as described previously. At least a portion of the subpanel may be visible for display. Furthermore, other subpanels (not shown) may be disposed in a logically adjacent position to subpanel 902 and not presently visible. In other embodiments, sets of at least one photo each within a given photo montage may comprise a subpanel configured to function as described previously. In certain embodiments, one or more of the subpanels may be visible for display at any one time.

A first change in orientation 904 (e.g., a counterclockwise rotation of ninety degrees) may cause subpanel 902 to be displayed in a new (landscape) orientation. As shown, photo montage 920 (and potentially others) is rotated in place to compensate for the new device orientation. Photo 940 is shown to have a square form factor and may rotate about a geometric center (e.g., centroid) for the square form factor. Photo 930 is shown to have a non-square rectangular form factor. As such, simply rotating about a geometric center may not necessarily produce desirable results. As an option, certain photos, such as photo 930, may rotate instead about a point of interest identified within the photo. The point of interest may include, without limitation, one of a focus point of interest, an exposure point of interest, and an identified object point of interest (e.g., a region identified as a face within the photo). In one embodiment, such point(s) of interest may be determined automatically (e.g. object recognition, etc.) or may be manually received (e.g. a user selects a point of interest on the photo, etc.).

In this particular example, a region identified as a face within photo 930 may represent an automatically selected point of interest and serve as a center of rotation when photo 930 is rotated between a portrait orientation and a landscape orientation for display. Alternatively, photo 930 may have been taken with a point of interest specified explicitly by the user (e.g., user may have touched on the face to indicate interest prior to taking photo 930), and the point of interest (focus and/or exposure) may then be stored within metadata for photo 930. As shown photo 930 rotates about a point of interest 932 associated with the face in photo 930. As such, the face remains visible despite other items in photo 930 going in or out of visibility while alternating between portrait and landscape orientations.

In certain embodiments, a specified point (e.g., point of interest) within a photo is used as a center of rotation in a thumbnail browser, icon browser, and/or other form of representative image browser.

Figure 10:
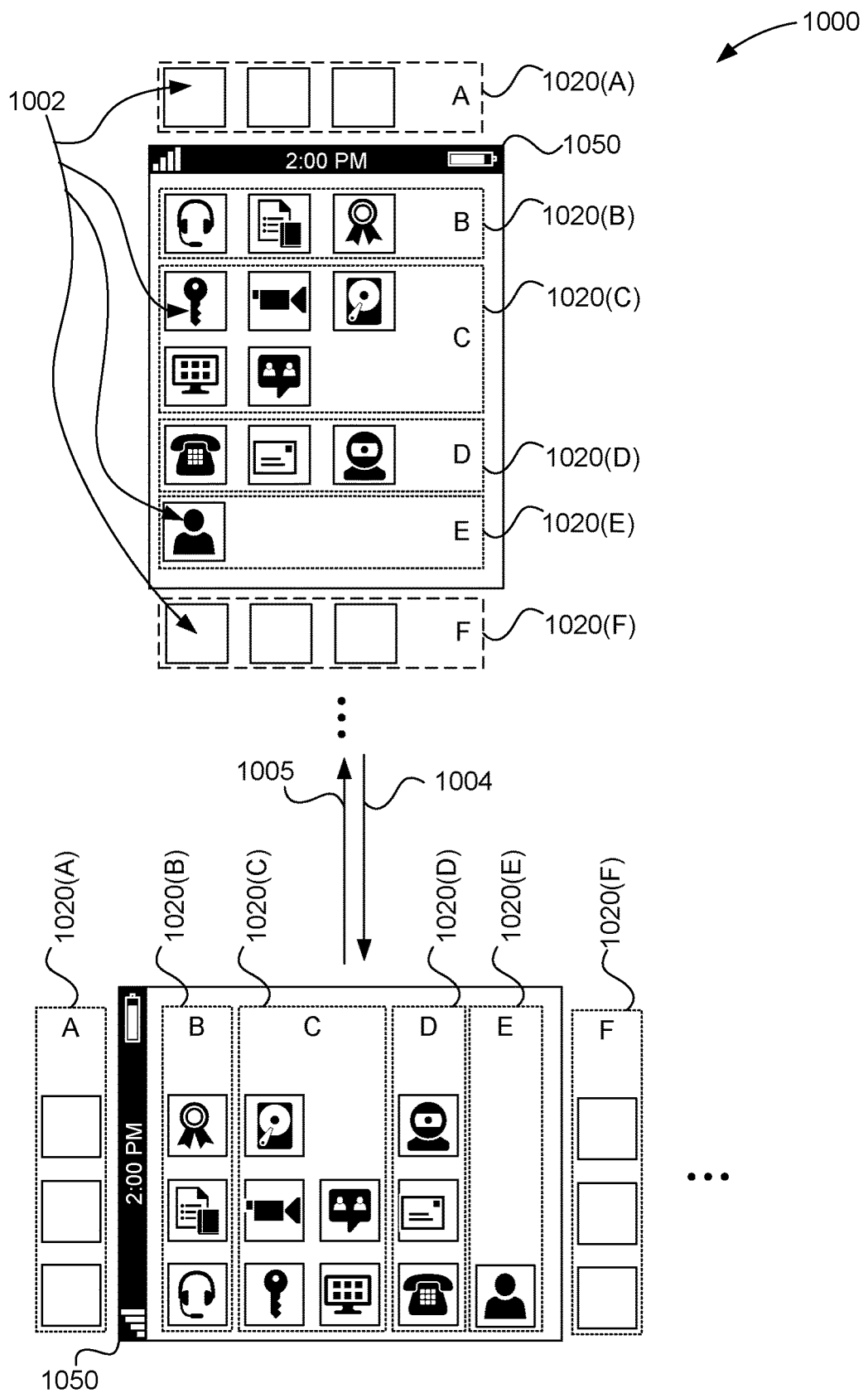
FIG. 10 illustrates a user interface flow for alphabetically organized icons, according to one embodiment.

FIG. 10 illustrates a user interface flow 1000 for alphabetically organized icons 1002, according to one embodiment. As shown, icons 1002 are organized into alphabetic groups 1020. For example, icons associated with a name (e.g. application name or file name) beginning with the letter "A" are organized into group 1020(A) and displayed within a region for group 1020(A); icons with a name beginning with the letter "B" are organized into group 1020(B) and displayed within a region for group 1020(B), and so forth. A given region may include a visual boundary, such a rectangle drawn around the region (as shown), one or more demarcation lines, alternating background shades or colors, or any other visually distinct indication of different regions. In one embodiment, an information bar 1050 is displayed on a top horizontal edge of a mobile device display screen when in portrait orientation as shown.

While the above example describes an embodiment that uses English letters and alphabetical organization, any system of characters may be implemented without departing the scope of the present disclosure. For example, icons may be organized according to any set of characters within the well-known Unicode system. As such, icons having file names in any one or more languages supported by Unicode characters may be organized and displayed according to the techniques described herein. In a separate embodiment, the organization of the icons may be configured automatically (e.g. alphabet progression, organization based on context, etc.) or may be manually determined (e.g. organization based on pictorial character, personal organization, etc.).

A first change in orientation 1004 (e.g., a counterclockwise rotation of ninety degrees) may cause groups 1020 to be displayed in a new overall landscape orientation with associated icons rotated, through animation, into upright positions. In one embodiment, as shown, information bar 1050 does not change physical position relative to a mobile device display screen in response to the first change in orientation 1004. In other embodiments, information bar 1050 may be repositioned, such as through animation or through a simple redraw operation, along a horizontal edge of the display screen as generally described previously.

As shown, the physical positions of icons 1002 on the display screen are preserved after the first change in orientation 1004. Furthermore, geometry for the groups 1020 is consistently presented on the display screen regardless of device orientation. Icons 1002 displayed within groups 1020 are rotated (e.g., through animation) in response to the first change in orientation 1004 to preserve an upright appearance. A second change in orientation 1005 restores the appearance of groups 1020 and icons 1002 to a portrait orientation. Icons 1002 are rotated into an upright position in response to each change in orientation.

Various embodiments of the present disclosure advantageously improve mobile device operation by reducing run time associated with locating and acting on data objects (files, applications, images, videos, audio clips, other media objects, etc.) displayed as representative images (icons, thumbnails, etc.). Run time, and therefore power consumption, may be improved (reduced) by allowing a user to keep visual track of a selected representative image regardless of changes to device orientation. By rotating the representative image in-place in response to a change in device orientation, the user is able to keep visual track of the representative image, thereby reducing run time associated with opening, running, editing, viewing, listening to, or otherwise operating on the data object associated with the representative image. Further advantage is achieved in scenarios when the user needs to zoom in on a representative image. By rotating a zoomed-in representative image in-place, the user is able to maintain visual track of the representative image. The techniques disclosed herein address inefficiencies associated with conventional systems, such inefficiencies typically require the user to spend time visually hunting for and/or scrolling through shuffled representative images following a change in device orientation; such hunting and scrolling operations require additional device run time and therefore additional device power consumption.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

We claim:

1. A mobile computing device comprising:
   a display unit configured to display a user interface;
   a non-transitory memory storing instructions; and
   one or more processors in communication with the display unit, wherein the one or more processors execute the instructions to:
   configure a first relationship between each of two or more representative images;
   cause the display unit to display a subpanel including the two or more representative images;
   receive a notification indicating a new orientation for the subpanel; and
   in response to the new orientation:
   generate an in-place rotation animation for each of the two or more representative images of the subpanel, wherein the in-place rotation animation occurs individually about an identified point associated with each of the two or more representative images, wherein the identified point includes a focus point of interest, an exposure point of interest, or an identified object point of interest; and
   maintain the first relationship between each of the two or more representative images.

2. The mobile computing device of claim 1, wherein the subpanel includes a grouping of icons.

3. The mobile computing device of claim 1, wherein the identified point includes a geometric center or a face displayed in each of the two or more representative images.

4. The mobile computing device of claim 1, wherein each of the two or more representative images include a form factor, the form factor including resizing or cropping each of the two or more representative images to a specific shape.

5. The mobile computing device of claim 1, wherein a second relationship is generated between the subpanel and at least one other adjacent subpanel.

6. The mobile computing device of claim 1, wherein the two or more representative images are icons.

7. The mobile computing device of claim 1, wherein the two or more representative images are each in a square form factor.

8. The mobile computing device of claim 1, wherein the two or more representative images are each in a non-square form factor.

9. The mobile computing device of claim 1, wherein the two or more representative images are image representative images.

10. The mobile computing device of claim 1, wherein the two or more representative images are video representative images.

11. The mobile computing device of claim 1, wherein the two or more representative images include at least one image data object and at least one video data object.

12. The mobile computing device of claim 1, wherein at least a first one of the two or more representative images is displayed in a first size form factor, and at least a second one of the two or more representative images is displayed in a second size form factor, where the first size form factor differs from the second size form factor.

13. The mobile computing device of claim 1, wherein a zoom level is maintained after the notification of the new orientation is received.

14. The mobile computing device of claim 1, wherein a second subpanel is displayed in response to a swipe motion.

15. The mobile computing device of claim 1, wherein the in-place rotation animation is timed independently for each of the two or more representative images.

16. The mobile computing device of claim 1, wherein each one of the two or more representative images is displayed at a different predetermined location relative to a physical origin for the display unit during the in-place rotation animation.

17. A computer program product comprising computer executable instructions stored on a non-transitory computer readable medium that when executed by a processor instruct the processor to:
   configure a first relationship between each of two or more representative images;
   cause a display unit to display a subpanel including the two or more representative images;
   receive a notification indicating a new orientation for the subpanel; and
   in response to the new orientation:
   generate an in-place rotation animation for each of the two or more representative images of the subpanel, wherein the in-place rotation animation occurs individually about an identified point associated with each of the two or more representative images, wherein the identified point includes a focus point of interest, an exposure point of interest, or an identified object point of interest; and
   maintain the first relationship between each of the two or more representative images.

18. A method, comprising:
   configuring, using a processor, a first relationship between each of two or more representative images;
   causing, using the processor, a display unit to display a subpanel including the two or more representative images;
   receiving, using the processor, a notification indicating a new orientation for the subpanel; and
   in response to the new orientation:
   generating, using the processor, an in-place rotation animation for each of the two or more representative images of the subpanel, wherein the in-place rotation animation occurs individually about an identified point associated with each of the two or more representative images, wherein the identified point includes a focus point of interest, an exposure point of interest, or an identified object point of interest; and
   maintaining, using the processor, the first relationship between each of the two or more representative images.

* * * * *